United States Patent
Yoshida et al.

(10) Patent No.: US 12,051,191 B2
(45) Date of Patent: Jul. 30, 2024

(54) SYSTEMS AND METHODS FOR ACQUIRING AND INSPECTING LENS IMAGES OF OPHTHALMIC LENSES

(71) Applicant: CooperVision International Limited, Fareham (GB)

(72) Inventors: Alexandra-Florentina Yoshida, Winchester (GB); Kirsty McCulloch, Southampton (GB)

(73) Assignee: CooperVision International Limited, Fareham (GB)

( * ) Notice: Subject to any disclaimer, the term of this patent is extended or adjusted under 35 U.S.C. 154(b) by 319 days.

(21) Appl. No.: 17/713,978

(22) Filed: Apr. 5, 2022

(65) Prior Publication Data

US 2023/0033187 A1 Feb. 2, 2023

Related U.S. Application Data

(60) Provisional application No. 63/226,419, filed on Jul. 28, 2021.

(51) Int. Cl.
*G06T 7/00* (2017.01)
*G06V 10/764* (2022.01)
(Continued)

(52) U.S. Cl.
CPC ............ *G06T 7/001* (2013.01); *G06V 10/764* (2022.01); *G06V 10/82* (2022.01); *G06V 20/70* (2022.01);
(Continued)

(58) Field of Classification Search
CPC .. G06V 10/764; G06V 10/7747; G06V 10/82; G06V 10/25; G06V 10/32;
(Continued)

(56) References Cited

U.S. PATENT DOCUMENTS 6,134,342 A 10/2000 Doke et al.
6,765,661 B2 7/2004 Biel et al.
(Continued)

FOREIGN PATENT DOCUMENTS

CN 109685756 A 4/2019
CN 110648310 A 1/2020
(Continued)

OTHER PUBLICATIONS

Chang, Chun-Li, Wen-Hong Wu, and Chi-Chun Hwang. "Automatic optical inspection method for soft contact lenses." International Conference on Optical and Photonic Engineering (icOPEN 2015). vol. 9524. SPIE, 2015. (Year: 2015).*
(Continued)

*Primary Examiner* — Vu Le
*Assistant Examiner* — Tracy Mangialaschi
(74) *Attorney, Agent, or Firm* — Alumen IP Law PC

(57) ABSTRACT

Systems and methods for acquiring and inspecting lens images of ophthalmic lenses using one or more cameras to acquire the images of the lenses in a dry state or a wet state. The images are preprocessed and then inputted into an artificial intelligence network, such as a convolutional neural network (CNN), to analyze and characterize for type of lens defects. The artificial intelligence network identifies defect regions on the images and output defect categories or classifications for each of the images based in part on the defect regions.

26 Claims, 29 Drawing Sheets

(51) Int. Cl.
*G06V 10/82* (2022.01)
*G06V 20/70* (2022.01)

(52) U.S. Cl.
CPC .......... *G06T 2207/20084* (2013.01); *G06T 2207/30108* (2013.01)

(58) Field of Classification Search
CPC .... G06V 10/28; G06V 20/70; G06V 2201/06; G06N 3/082; G06N 3/0464; G01N 21/958; G01N 2021/8883; G01N 2021/9583; G01M 11/0207; G01M 11/0214; G01M 11/0278; G06T 7/246; G06T 7/001; G06T 7/11; G06T 7/174; G06T 2207/30108; G06T 2207/10072; G06T 2207/20081; G06T 2207/20084
See application file for complete search history.

(56) References Cited

U.S. PATENT DOCUMENTS

| | | | |
|---|---|---|---|
| 7,256,881 | B2 | 8/2007 | Leppard et al. |
| 7,346,416 | B2 | 3/2008 | Wadding et al. |
| 7,477,366 | B2 | 1/2009 | Clements et al. |
| 7,990,531 | B2 | 8/2011 | Clements et al. |
| 9,140,545 | B2 | 9/2015 | Vertoprakhov et al. |
| 10,145,756 | B2 | 12/2018 | Vertoprakhov et al. |
| 2004/0008877 | A1* | 1/2004 | Leppard ............ G01M 11/0235 382/141 |
| 2016/0223429 | A1 | 8/2016 | Fecnher et al. |
| 2017/0138867 | A1 | 5/2017 | Smorgon et al. |
| 2021/0264585 | A1* | 8/2021 | Wong ................... G06V 10/454 |

FOREIGN PATENT DOCUMENTS

| | | | |
|---|---|---|---|
| CN | 111062961 | A * | 4/2020 |
| CN | 111062961 | A | 4/2020 |
| CN | 111507960 | A | 8/2020 |
| CN | 111583187 | A | 8/2020 |
| CN | 112767365 | A | 5/2021 |
| KR | 20200080367 | A | 7/2020 |
| WO | WO 2016/071708 | A1 | 5/2016 |
| WO | 2020152925 | A1 | 7/2020 |

OTHER PUBLICATIONS

Lin, Hong Dar and Chen Hsing-Lun; "Detection of Surface Flaws on Textured LED Lenses Using Wavelet Packet Transform Based Partial Least Squares Techniques;" International Journal of Innovative Computing, Information and Control; vol. 15, No. 3, Jun. 2019; ICIC International; ISSN 1349-4198; pp. 905-921.

Schoch, Alexander; Perez, Patric; Linz-Dittrich, Sabine; Bach, Carlo; and Ziolek, Carsten; "Automating the Surface Inspection on Small Customer-Specific Optical Elements;" Institute for Production Metrology, Materials and Optics NTB Interstate University of Applied Sciences of Technology, Wedenbergstrasse 4, 9471 Buchs, Switzerland; 11 pages, 2018.

Combined Search and Examination Report from UK Intellectual Property Office on co-pending UK application (GB2205494.4) dated Oct. 17, 2022.

International Search Report and Written Opinion on corresponding PCT application (PCT/GB2022/050932) from International Searching Authority (EPO) dated Jul. 18, 2022.

Chang Chun-Li et al., "Automatic optical inspection method for soft contact lenses", Proceedings of Spie, IEEE, US, vol. 9524, Jul. 17, 2015, pp. 952402-952402.

Zhou Bolei et al., "Learning Deep Features for Discriminative Localization", 2016 IEEE Conference on Computer Vision and Pattern Recognition (CVPR), IEEE, Jun. 27, 2016, pp. 2921-2929.

* cited by examiner

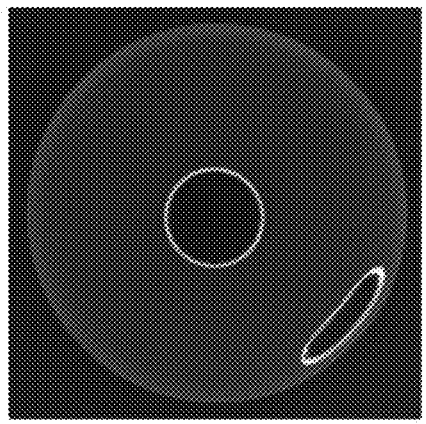
*FIG. 4A*
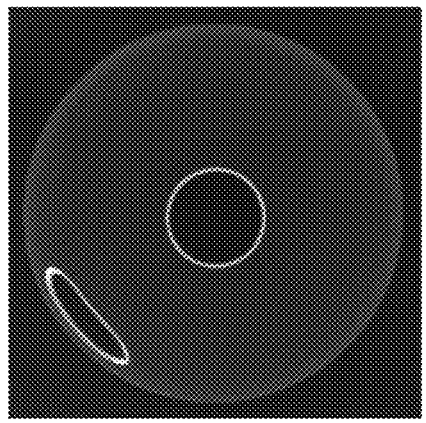
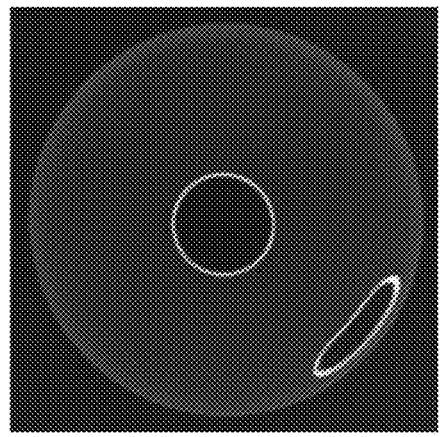
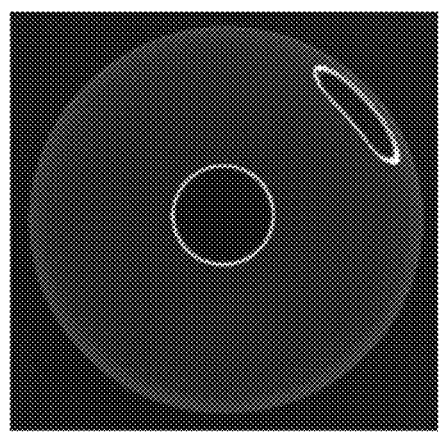
*FIG. 4B*

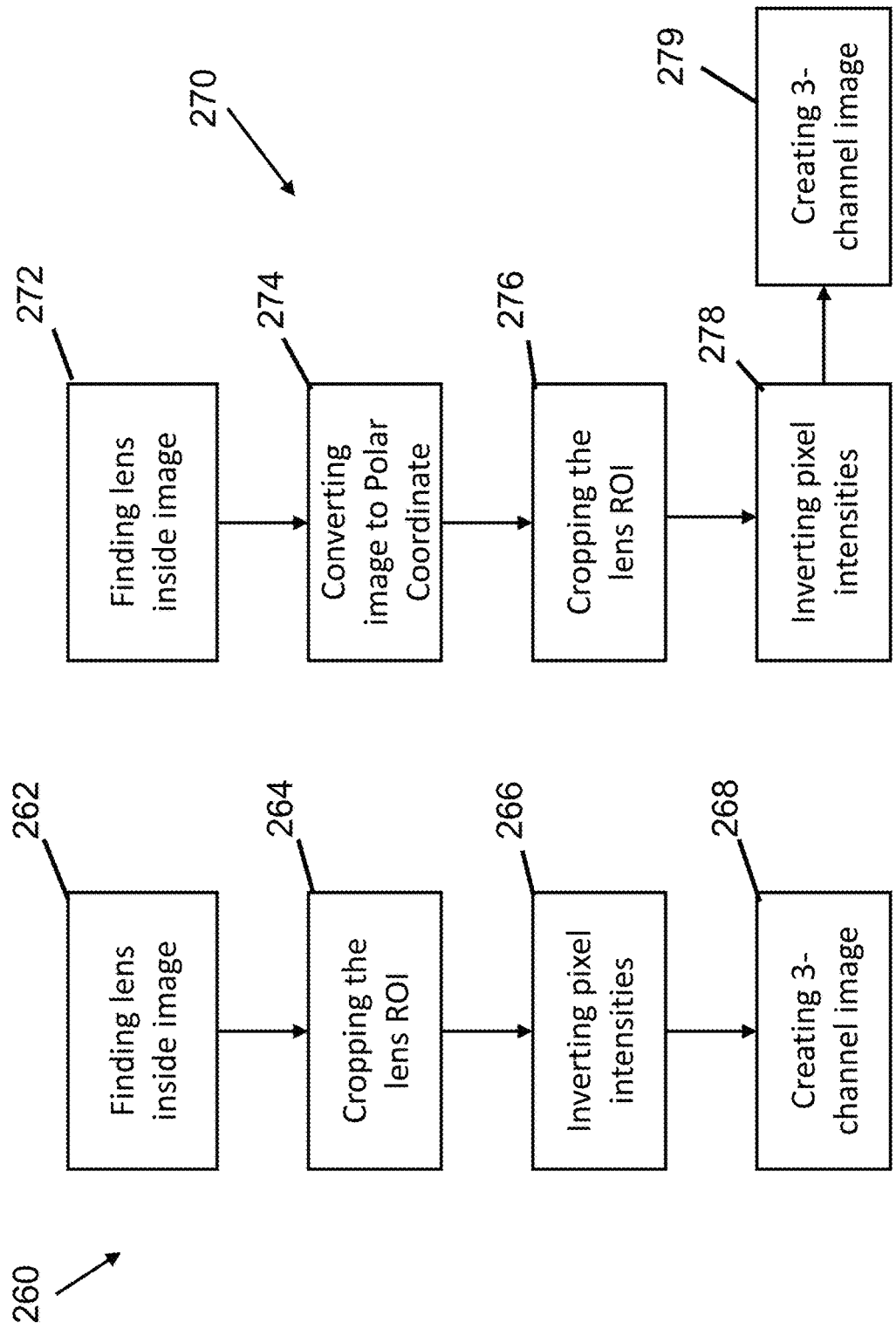

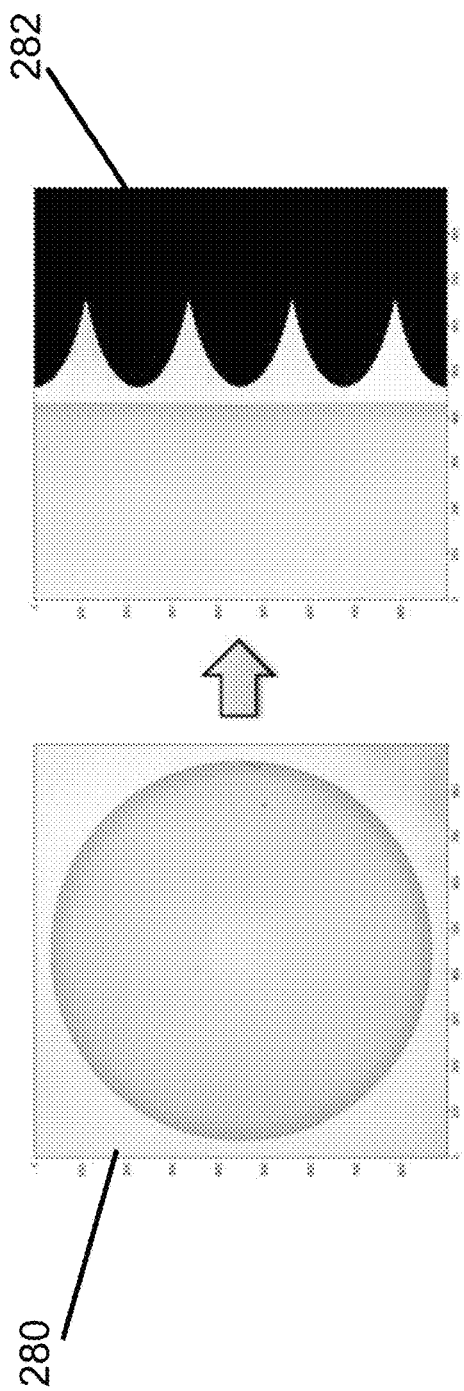
*Figure 22: From cartesian to polar coordinates*
FIG. 8
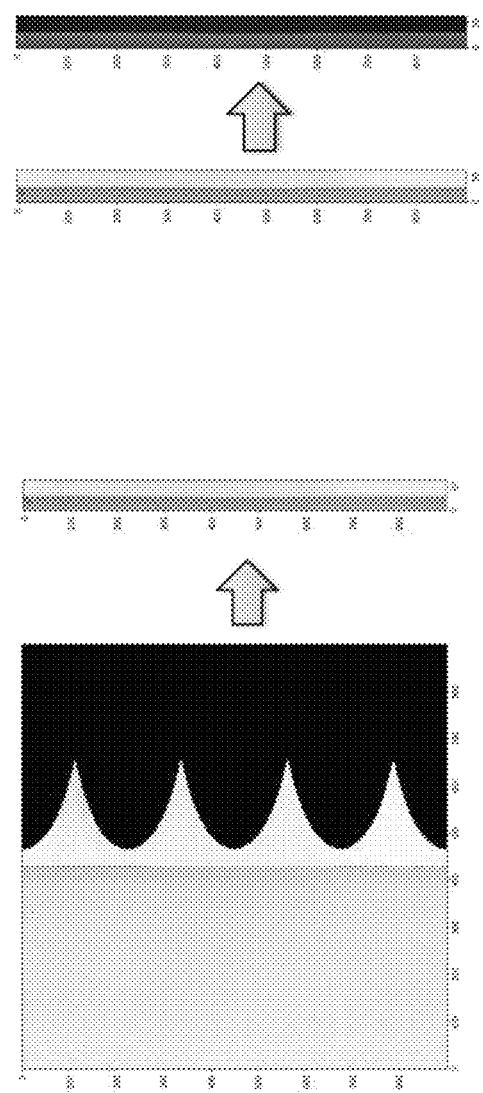
*Figure 23: Cropping the ROI of the EDGE*
FIG. 9
FIG. 10

| Library | Convolutional Block | Layer name | Layer Input Shape | Layer Output shape |
|---|---|---|---|---|
| VGG19 | | Input | (900, 900, 3) | (900, 900, 3) |
| | block1 | block1_conv1 | (900, 900, 3) | (900, 900, 64) |
| | | block1_conv2 | (900, 900, 64) | (900, 900, 64) |
| | | block1_pool | (900, 900, 64) | (450, 450, 64) |
| | block2 | block2_conv1 | (450, 450, 64) | (450, 450, 128) |
| | | block2_conv2 | (450, 450, 128) | (450, 450, 128) |
| | | block2_pool | (450, 450, 128) | (225, 225, 128) |
| | block3 | block3_conv1 | (225, 225, 128) | (225, 225, 256) |
| | | block3_conv2 | (225, 225, 256) | (225, 225, 256) |
| | | block3_conv3 | (225, 225, 256) | (225, 225, 256) |
| | | block3_conv4 | (225, 225, 256) | (225, 225, 256) |
| | | block3_pool | (225, 225, 256) | (112, 112, 256) |
| | block4 | block4_conv1 | (112, 112, 256) | (112, 112, 512) |
| | | block4_conv2 | (112, 112, 512) | (112, 112, 512) |
| | | block4_conv3 | (112, 112, 512) | (112, 112, 512) |
| | | block4_conv4 | (112, 112, 512) | (112, 112, 512) |
| | | block4_pool | (112, 112, 512) | (56, 56, 512) |
| | block5 | block5_conv1 | (56, 56, 512) | (56, 56, 512) |
| | | block5_conv2 | (56, 56, 512) | (56, 56, 512) |
| | | block5_conv3 | (56, 56, 512) | (56, 56, 512) |
| | | block5_conv4 | (56, 56, 512) | (56, 56, 512) |
| | | block5_pool | (56, 56, 512) | (28, 28, 512) |
| Densely connected layers | N/A | flatten_1 | (28, 28, 512) | (401408, 1) |
| | N/A | dense_1 | (401408, 1) | (256, 1) |
| | N/A | dense_2 | (256, 1) | (8, 1) |

*FIG. 12*

| Library | Convolutional Block | Layer name | Layer Output shape | Layer Output shape |
|---|---|---|---|---|
| VGG19 | | Input | (900, 50, 3) | (900, 50, 3) |
| | block1 | block1_conv1 | (900, 50, 3) | (900, 50, 64) |
| | | block1_conv2 | (900, 50, 64) | (900, 50, 64) |
| | | block1_pool | (900, 50, 64) | (450, 25, 64) |
| | block2 | block2_conv1 | (450, 25, 64) | (450, 25, 128) |
| | | block2_conv2 | (450, 25, 128) | (450, 25, 128) |
| | | block2_pool | (450, 25, 128) | (225, 12, 128) |
| | block3 | block3_conv1 | (225, 12, 128) | (225, 12, 256) |
| | | block3_conv2 | (225, 12, 256) | (225, 12, 256) |
| | | block3_conv3 | (225, 12, 256) | (225, 12, 256) |
| | | block3_conv4 | (225, 12, 256) | (225, 12, 256) |
| | | block3_pool | (225, 12, 256) | (112, 6, 256) |
| | block4 | block4_conv1 | (112, 6, 256) | (112, 6, 512) |
| | | block4_conv2 | (112, 6, 512) | (112, 6, 512) |
| | | block4_conv3 | (112, 6, 512) | (112, 6, 512) |
| | | block4_conv4 | (112, 6, 512) | (112, 6, 512) |
| | | block4_pool | (112, 6, 512) | (56, 3, 512) |
| | block5 | block5_conv1 | (56, 3, 512) | (56, 3, 512) |
| | | block5_conv2 | (56, 3, 512) | (56, 3, 512) |
| | | block5_conv3 | (56, 3, 512) | (56, 3, 512) |
| | | block5_conv4 | (56, 3, 512) | (56, 3, 512) |
| | | block5_pool | (56, 3, 512) | (28, 1, 512) |
| Densely connected layers | N/A | flatten_1 | (28, 1, 512) | (14336, 1) |
| | N/A | dense_1 | (14336, 1) | (256, 1) |
| | N/A | dense_2 | (256, 1) | (3, 1) |

*FIG. 13*

| Setting | Value |
|---|---|
| Training steps per epoch | 100 |
| Validation steps per epoch | 50 |
| Train batch size | 40 |
| Validation batch size | 40 |
| Training metrics | accuracy |
| Learning rate | 2*10^-5 |
| Loss function | Categorical cross-entropy |

|  | | | | Predicted | | | | | |
|---|---|---|---|---|---|---|---|---|---|
| | | 0 Brains | 1 Bubble | 2 Debris | 3 Dirty Sapphire | 4 Double Lens | 5 Good Lens | 6 Scratch | 7 Void |
| Ground Truth | 0 Brains | 498 | | | | | | | |
| | 1 Bubble | | 496 | | | | | | |
| | 2 Debris | | | 496 | 1 | | | | |
| | 3 Dirty Sapphire | | | 2 | 440 | 3 | 49 | 3 | |
| | 4 Double Lens | | | | 17 | 479 | | 6 | |
| | 5 Good Lens | | | | 3 | | 496 | | |
| | 6 Scratch | | | | 1 | | | 499 | |
| | 7 Void | | | | | | | | 484 |
| | Total | 498 | 496 | 497 | 497 | 502 | 499 | 500 | 484 |

*FIG. 28*

| Category | Total | TP | FP | FN | TN | Accuracy | Precision | Recall |
|---|---|---|---|---|---|---|---|---|
| Brains | 498 | 498 | 0 | 0 | 3475 | 1.00 | 1.000 | 1.000 |
| Bubble | 496 | 496 | 0 | 0 | 3477 | 1.00 | 1.000 | 1.000 |
| Debris | 497 | 496 | 2 | 1 | 3475 | 1.00 | 0.996 | 0.998 |
| Dirty Sapphire | 497 | 440 | 22 | 57 | 3419 | 0.98 | 0.952 | 0.885 |
| Double Lens | 502 | 479 | 3 | 23 | 3448 | 0.99 | 0.994 | 0.954 |
| Good Lens | 499 | 496 | 49 | 3 | 3970 | 0.99 | | 0.994 |
| Scratch | 500 | 499 | 9 | 1 | 3472 | 1.00 | 0.982 | 0.998 |
| Void | 484 | 484 | 0 | 0 | 3489 | 1.00 | 1.000 | 1.000 |

FIG. 29

|  | | Predicted | | |
|---|---|---|---|---|
|  | | Debris | GoodLens | Pinched |
| Ground Truth | Debris | 486 | 41 | 0 |
|  | GoodLens | 6 | 494 | 0 |
|  | Pinched | 0 | 0 | 502 |
|  |  | 527 | 500 | 502 |

*FIG. 30*

| Category | Total | TP | FP | FN | TN | Accuracy | Precision | Recall |
|---|---|---|---|---|---|---|---|---|
| Debris | 527 | 486 | 6 | 41 | 996 | 0.97 | 0.99 | 0.92 |
| GoodLens | 500 | 494 | 41 | 6 | 988 | 0.97 | 0.92 | 0.99 |
| Pinched | 502 | 502 | 0 | 0 | 1027 | 1.00 | 1.00 | 1.00 |

*FIG. 31*

| Library | Convolutional Block | Layer name | Layer Output shape |
|---|---|---|---|
| VGG16 | | Input | (780, 590, 3) |
| | block1 | block1_conv1 | (780, 590, 64) |
| | | block1_conv2 | (780, 590, 64) |
| | | block1_pool | (390, 295, 64) |
| | block2 | block2_conv1 | (390, 295, 128) |
| | | block2_conv2 | (390, 295, 128) |
| | | block2_pool | (195, 147, 128) |
| | block3 | block3_conv1 | (195, 147, 256) |
| | | block3_conv2 | (195, 147, 256) |
| | | block3_conv3 | (195, 147, 256) |
| | | block3_pool | (97, 73, 256) |
| | block4 | block4_conv1 | (97, 73, 512) |
| | | block4_conv2 | (97, 73, 512) |
| | | block4_conv3 | (97, 73, 512) |
| | | block4_pool | (48, 36, 512) |
| | block5 | block5_conv1 | (48, 36, 512) |
| | | block5_conv2 | (48, 36, 512) |
| | | block5_conv3 | (48, 36, 512) |
| | | block5_pool | (24, 18, 512) |
| Densely connected layers | NA | conv2d_1 | (26, 26, 512) |
| | N/A | flatten_1 | (221184, 1) |
| | N/A | dense_1 | (256, 1) |
| | N/A | dense_2 | (3, 1) |

*FIG. 32*

|  | Lyer Name | Output Shape | Parameter # |
|---|---|---|---|
| N/A | flatten_1 | (221184, 1) | 0 |
| N/A | dropout_1 | (221184, 1) | 0 |
| N/A | dense_1 | (256, 1) | 56623360 |
| N/A | dense_2 | (1, 1) | 257 |

*FIG. 33*

|  | Layer Name | Output Shape | Parameter # |
|---|---|---|---|
| N/A | conv2d_1 | (26, 26, 512) | 2359808 |
| N/A | flatten_1 | (346112, 1) | 0 |
| N/A | dense_1 | (256, 1) | 88604928 |
| N/A | dense_2 | (8, 1) | 2056 |

*FIG. 34*

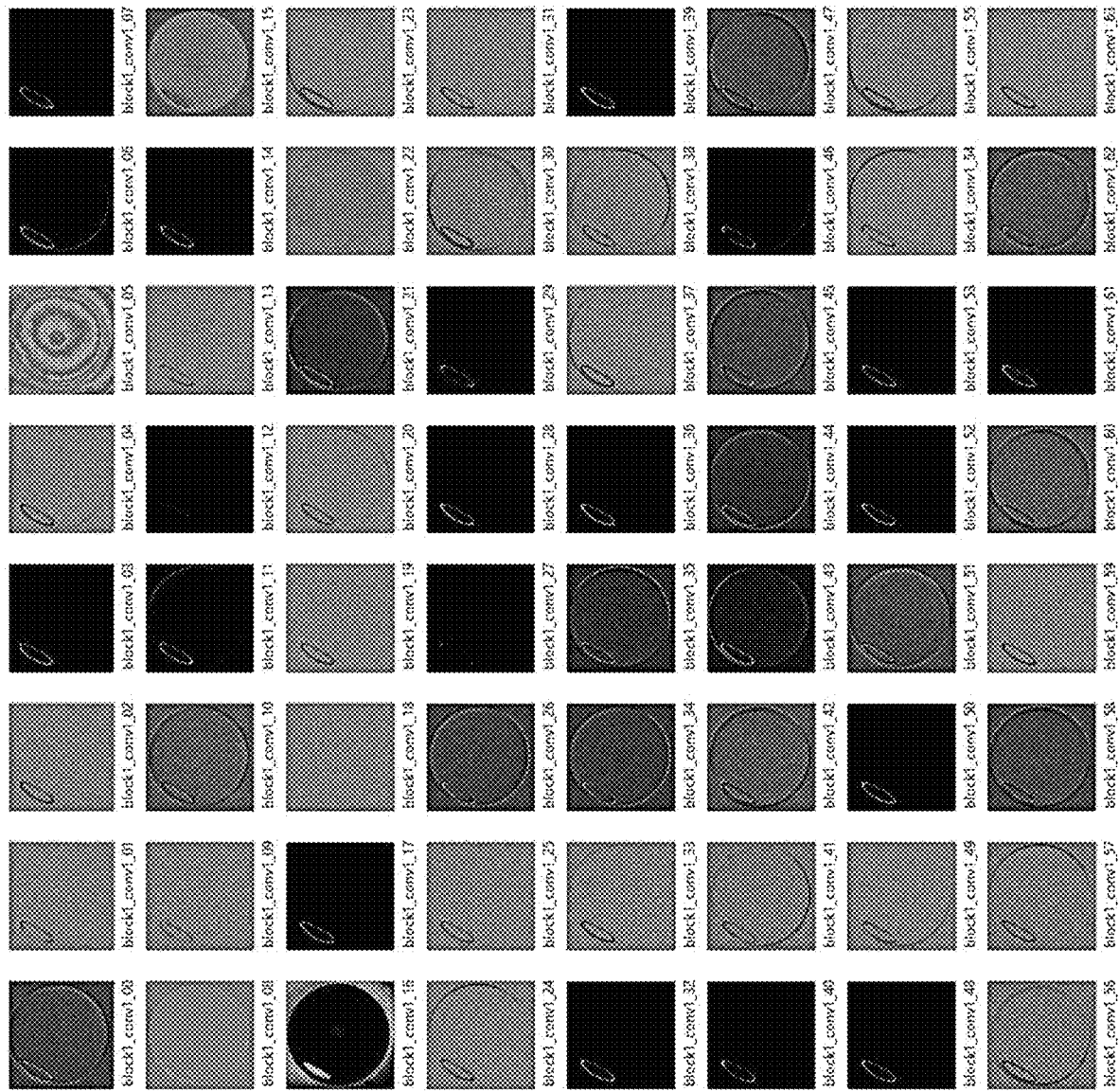
FIG. 36A — Bubble 1

*Bubble 2*

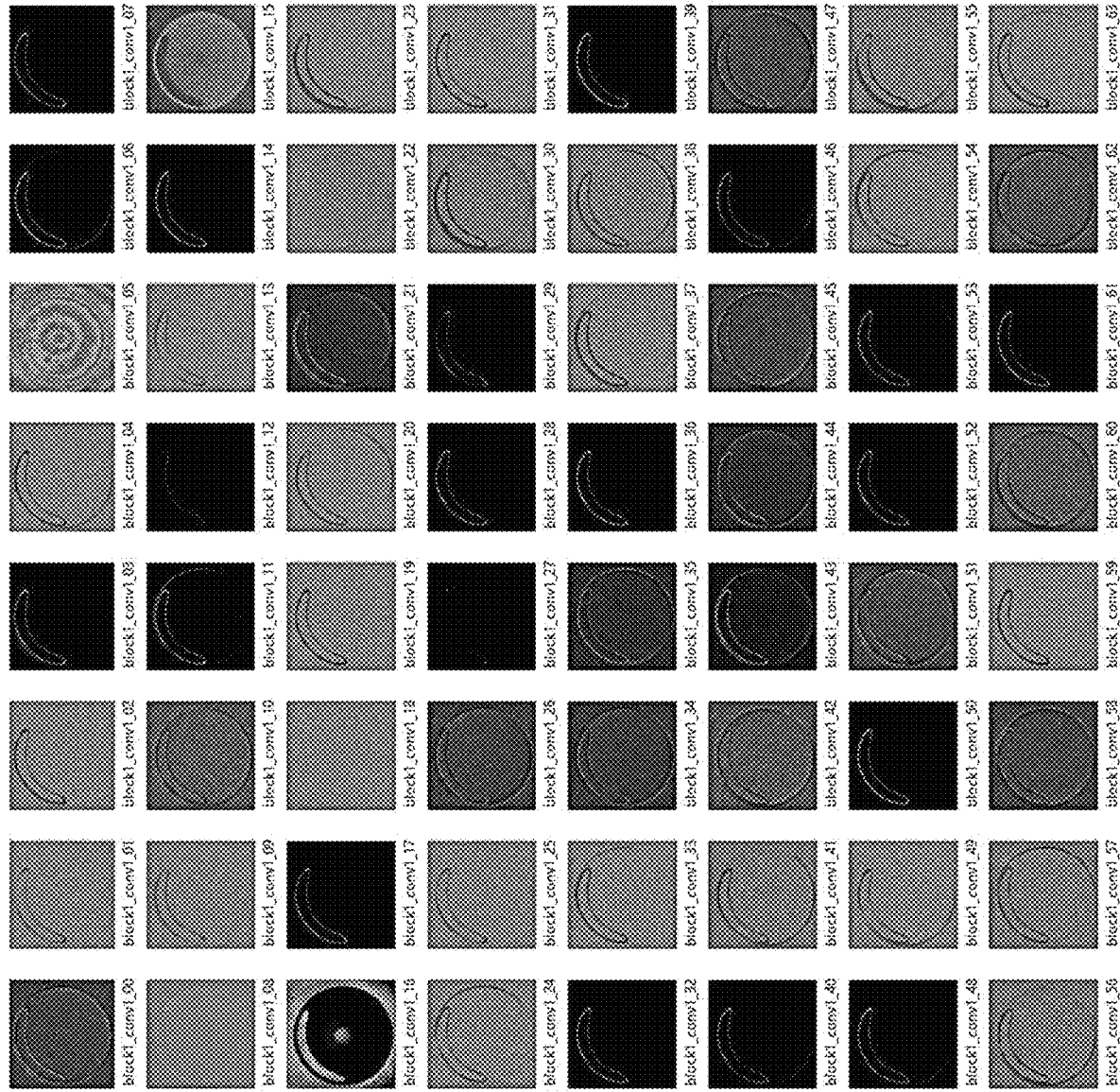
FIG. 36C — Bubble 3

| Class | Brains | Bubble | Debris | Dirty Sapphire | Double Lens | Good Lens | Scratch | Void |
|---|---|---|---|---|---|---|---|---|
| Probability | 0.20 | 0.00 | 0.74 | 0.00 | 0.06 | 0.00 | 0.00 | 0.00 |

SYSTEMS AND METHODS FOR ACQUIRING AND INSPECTING LENS IMAGES OF OPHTHALMIC LENSES

FIELD OF ART

The present disclosure is generally related to lens inspection systems and more particularly to lens inspection systems that use artificial intelligence to evaluate images of ophthalmic lenses and classify the images according to different lens defect categories or classes.

BACKGROUND

Artificial intelligence (AI), such as machine learning (ML), has demonstrated significant success in improving inspection accuracy, speed of image characterization or classification, and image interpretation for a wide range of tasks and applications. Machine learning is being used in almost every type of industry. It is helping people to minimize their workload as machines are capable of executing most of the human tasks with high performance. Machines can do predictive analysis such as classification & regression (predicting numerical values) and tasks like driving car which require intelligence and dynamic interpretation.

Machine learning involves providing data to the machine so that it can learn patterns from the data, and it can then predict solutions for similar future problems. Computer vision is a field of Artificial Intelligence which focuses on tasks related to images. Deep learning combined with computer vision is capable of performing complex operations ranging from classifying images to solving scientific problems of astronomy and building self-driving cars.

However, many deep learning networks are unable to process images with sufficient accuracy or trained with proper parameters to warrant being relied upon in a high-speed large-scale setting. In still other settings, deep learning routines may not be sensitive enough to distinguish between regions in an image or adapted with proper parameters to implement in a particular large scale manufacturing operation.

SUMMARY

Aspects of the invention comprise systems and methods for lens inspection and outputting defect classes that are representative of the different defects found on one or more images, using artificial intelligence (AI) models. In exemplary embodiments, systems and methods are provided in which a lens edge image and a lens surface image for each lens or a plurality of ophthalmic or contact lenses to be inspected by the lens inspection system of the present invention are separated into edge image datasets and surface image datasets. The two different datasets are processed by two different AI models to predict defects, if any, that are captured on the images and then outputting the defects based on each defect's class or type.

Exemplary embodiments include using convolutional neural networks (CNNs) as the AI models to analyze and classify contact lens images. Preferred CNN models include the VGG16 Net and VGG19 Net models, which can be re-trained to analyze and classify lens defect classes based on images of the lenses. While using an "edge" AI model to analyze and classify lens edge images and using a "surface" AI model to analyze and classify lens surface images are preferred, aspects of the invention contemplate training the same AI model to analyze and predict defects for both the lens edge and the lens surface on the same image. For example, an imaging system can have a large depth of field, and a large aperture or large f-number, and can capture an image with both the lens edge and lens surface in focus, thus allowing for a single AI model to analyze and predict lens edge defects, lens surface defects, or both defect types within a same image.

A further aspect of the invention includes the preparation of input ready images based on image templates. If a dataset contains images taken from eight cameras, as an example, eight image templates can be created to account for variations in the distance of the camera and the focal length of each camera. Training images and production images can be normalized, such as resized, based on the templates used to locate the lens region inside the raw image. In some examples, the training and the production images can be resized without the use of templates.

In yet other aspects of the invention, intermediate activations of the different convolutional layers are visualized, such as outputted as images, known as class activation maps (CAMs). A CAM image shows different regions of the image that have been used by the model to influence or contribute to the final output of the model. During training, CAMs can be used by the trainer to evaluate the performance of the model and, if necessary, to make corrections to the model, such as to lock and unlock additional layers, use additional training images, etc. Images generated can be provided as heatmaps and can be annotated with bounding boxes to more readily convey the regions of interest.

Other aspects of the invention include a method for inspecting ophthalmic lenses and assigning classification to images of the ophthalmic lenses. The method can comprise: a) accessing a first image with a computer system, the first image comprising a lens edge image or a lens surface image of a first ophthalmic lens; b) identifying a region on the first image to analyze for at least one lens defect by processing the first image with an artificial intelligence (AI) network implemented with a hardware processor and a memory of the computer system; c) generating a first intermediate activation image based on the first image and outputting the first intermediate activation image with a defect region; d) labelling the defect region on the first intermediate activation image with at least one of a heatmap and a bounding box to define a labeled intermediate activation image; and e) generating and outputting a classification for the first image with the AI network to produce a first classified image, the classification based at least in part on the defect region, the classification being one of a plurality of lens surface defect classes or one of a plurality of lens edge defect classes.

The defect region of an image of a lens can be represented by a region on the image with distinct pixel intensities from the remaining regions of the image. The defect region can be labeled with a heat map and/or a bounding box.

The AI network or model can be a convolutional neural network (CNN) for image classification, and specifically a VGG Net with other deep neural networks for image processing contemplated, such as LeNet, AlexNet, GoogLeNet/Inception, and ResNet, ZFNet.

The first image of the ophthalmic lens can be acquired when the ophthalmic lens is located on a support in a dry state. In an example, the support can be made from a sapphire material.

The first image of the ophthalmic lens can alternatively be acquired when the ophthalmic lens is in a liquid bath, such as in a transfer tray or a blister pack in a wet state. The liquid bath can be a saline solution.

The plurality of lens surface defect classes can comprise at least two classes, at least three classes, or more than three classes. In other examples, the classes can comprise at least eight classes, which can include a class for a good lens.

The at least two classes for the surface model can comprise a Good Lens class and a Bad Lens. The at least three classes can comprise a Good Lens class, a Bubble class, and a Scratch class. Where eight classes are utilized to classify the lens defects, they can include "Brains", "Bubble", "Debris", "Dirty sapphire", "Double lens", "Good lens", "Scratch", and "Void". However, the surface models can be trained on more or fewer than eight surface defect types. For example, the surface models can be trained with images with no lens, with a pinched lens, with a lens that is too small, with a lens that is too large, and/or with a lens that is too eccentric. The number of classes can include any number of combinations of the foregoing listed classes.

The classification outputted by the AI network can be a text, a number, or an alpha-numeric identifier.

The first image can be acquired by a first camera and the first image having a height pixel value and a width pixel value and wherein the height and width pixel values are sized based on a template image acquired by the first camera.

The first image can have a second set of pixel intensities that has been inverted from a first set of pixel intensities.

The first image can have two additional identical images, and the first image and the two additional identical images define a three-channel image.

The first image can have a lens center and wherein the lens center can be defined relative to an upper left corner of the first image.

The first ophthalmic lens represented in the first image can be represented in a polar coordinate system or a cartesian coordinate system.

The polar coordinate system can be converted from the cartesian coordinate system.

The first image can be created by rotating an original image.

The first image can be created by flipping an original image, by zooming in or out of the original image by a small value, by adjusting the light intensity of the original image, or combinations thereof. The flipping can be performed in 90-degrees increment or by a different angular rotation.

The method can further comprise retraining or finetuning the AI network based on information provided by a labeled intermediate activation image.

The first image can be a lens edge image and the method can further comprise accessing a second image with the computer system, the second image being a lens surface image of the first ophthalmic lens.

The second image can be acquired by a second camera and the second image can have a height pixel value and a width pixel value and wherein the height and width pixel values of the second image are sized based on a template image acquired by the second camera.

The second image can have two additional identical images, and the second image and the two additional identical images define a three-channel image.

The second image can have a second set of pixel intensities that has been inverted from a first set of pixel intensities.

The method can further comprise generating a second intermediate activation image based on the second image and outputting the second intermediate activation image with a defect region.

The method can further comprise labelling the defect region on the second intermediate activation image with at least one of a heatmap and a bounding box to define a second labeled intermediate activation image. In some examples, the defect region on an original image, for each of a plurality of images to be analyzed or trained, is labeled, such as with a bounding box or by highlighting the contour of the defect region. The labelled original image may be used for training, for displaying, for marketing, etc.

The second labeled intermediate activation image can be used to re-train or finetune the AI network.

The method can further comprise generating and outputting a classification for the second image with the AI network, the classification based at least in part on the defect region, the classification being one of a plurality of lens surface defect classes.

In some embodiments, a plurality of lens edge defect classes can comprise at least two classes, at least three classes, or more than three classes. In other examples, the classes can comprise at least eight classes, which can include a class for a good lens.

The method can further comprise comparing the classification for the first classified image against a preprocessed image or an original image of the first image that has been manually examined and identified as ground truth and from which the first classified image is generated. The manual examination of the preprocessed image or original image of the first image classified with one of the plurality of lens surface defect classes, one of the plurality of lens edge defect classes, or both the lens surface defect and lens edge defect classes.

The at least two classes for the edge model can comprise a Good Lens class and a Bad Lens. The at least three classes for the edge model can comprise a Good Lens class, a Bubble class, and a Scratch class. Additional classes or where more than three edge classes are practiced, the edge models can be trained with images with no lens, with an edge split, with a pinched lens, with an edge chip, with a lens that is too small, with a lens that is too large, and/or with a lens that is too eccentric. The number of classes can include any number of combinations of the foregoing listed classes.

A still further aspect of the invention includes a system for classifying lens images of ophthalmic lenses. The system for classifying lens images of ophthalmic lenses can comprise: at least one hardware processor; a memory having stored thereon instructions that when executed by the at least one hardware processor cause the at least one hardware processor to perform steps comprising: a) accessing a first image from the memory, the first image comprising a lens edge image or a lens surface image of a first ophthalmic lens; b) accessing a trained convolutional neural network (CNN) from the memory, the trained CNN having been trained on lens images of ophthalmic lenses in which each of the ophthalmic lenses is either a good lens or has at least one lens defect; c) generating an intermediate activation image based on the first image and outputting the intermediate activation image with a defect region; d) labelling the defect region on the intermediate activation image with at least one of a heatmap and a bounding box to define a labeled intermediate activation image; and e) generating and outputting a classification for the first image, the classification based at least in part on the defect region, the classification being one of a plurality of lens surface defect classes or one of a plurality of lens edge defect classes.

The intermediate activation image, or CAM, can be taken from an output of the last convolutional layer of the CNN model. The intermediate activation image can be superimposed on the first image prior to labelling the defection region of the intermediate activation image. In an example, the intermediate activation image is the last intermediate image created as the output of the last convolutional layer, which may be referred to as a class activation map or CAM.

A further aspect of the invention includes a method for inspecting ophthalmic lenses and assigning classification to images of the ophthalmic lenses comprising: a) accessing a first image with a computer system, the first image comprising a lens edge image or a lens surface image of a first ophthalmic lens; b) identifying a region on the first image to analyze for lens defect by processing the first image with an artificial intelligence (AI) network implemented with a hardware processor and a memory of the computer system; c) generating a class activation map (CAM) based on the first image and outputting the CAM with a defect region; d) labelling the defect region on the CAM with at least one of a heatmap and a bounding box to define a labeled CAM; and e) generating and outputting a classification for the first image with the AI network to produce a first classified image, the classification based at least in part on the defect region, the classification being one of a plurality of lens surface defect classes or one of a plurality of lens edge defect classes.

The first image of the ophthalmic lens can be acquired when the ophthalmic lens is located on a support in a dry state.

The first image of the ophthalmic lens can be acquired when the ophthalmic lens is in a liquid bath in a wet state.

The plurality of lens surface defect classes can comprise at least two classes.

The plurality of lens surface defect classes can comprise at least three classes and the at least three classes comprise a Good Lens class, a Bubble class, and a Scratch class.

The classification outputted by the AI network can comprise a text, a number, or an alpha-numeric identifier.

The first image can be acquired by a first camera and the first image can have a height pixel value and a width pixel value and wherein the height and width pixel values can be sized based on a template image acquired by the first camera.

The first image can have a second set of pixel intensities that can be inverted from a first set of pixel intensities.

The first image can have two additional identical images, and the first image and the two additional identical images can define a three-channel image.

The first image can a lens center and wherein the lens center can be defined relative to an upper left corner of the first image.

The first ophthalmic lens represented in the first image can be represented in a polar coordinate system.

The polar coordinate system can be converted from a cartesian coordinate system.

The first image can have a second set of pixel intensities that has been inverted from a first set of pixel intensities.

The first image can be rotated from an original image.

The first image can be flipped from an original image.

The method can further comprise the steps of retraining or finetuning the AI network based on information provided by the labeled CAM.

The method can further comprise the step of retraining or finetuning the AI network by performing at least one of the following steps: (1) removing fully connected nodes at an end of the AI network where actual class label predictions are made; (2) replacing fully connected nodes with freshly initialized ones; (3) freezing earlier or top convolutional layers in the AI network to ensure that any previous robust features learned by the AI model are not overwritten or discarded; (4) training only fully connected layers with a certain learning rate; and (5) unfreezing some or all convolutional layers in the AI network and performing additional training with same or new datasets with a relatively smaller learning rate.

The first image can be a lens edge image of a first ophthalmic lens and a second image accessed by the computer system can be a lens surface image of the first ophthalmic lens.

The second image can be acquired by a second camera and the second image having a height pixel value and a width pixel value and wherein the height and width pixel values of the second image are sized based on a template image acquired by the second camera.

The second image can have two additional identical images, and the second image and the two additional identical images can define a three-channel image.

The second image can have a second set of pixel intensities that has been inverted from a first set of pixel intensities.

The CAM can be a first CAM and can further comprise generating a second CAM based on the second image and outputting the second CAM with a defect region.

The method can further comprise labelling the defect region on the second CAM with at least one of a heatmap and a bounding box to define a second labeled CAM.

The second labeled CAM can be used to re-train or finetune the AI network.

The method can further comprise generating and outputting a classification for the second image with the AI network, the classification based at least in part on the defect region, the classification being one of a plurality of lens surface defect classes.

The plurality of lens surface defect classes can comprise at least three classes.

The at least three classes can comprise a Good Lens class, a Bubble class, and a Scratch class.

The method can further comprise a step of classifying lens surface defects, or lens edge defects, or both the lens surface defects and lens edge defects to generate the lens surface defect classes, the lens edge defect classes, or both.

The step of classifying the lens can be performed before the accessing step.

The step of classifying the lens can be performed manually.

The first image can be labeled with a bounding box around a region of interest, wherein the bounding box around the region of interest on the first image can be based on the labeled intermediate activation image.

The CAM can be computed based on the output of the last convolutional layer.

The first image can be a preprocessed image and wherein the CAM is extrapolated and superimposed over the preprocessed first image.

A further aspect of the invention is a system for classifying lens images of ophthalmic lenses comprising: at least one hardware processor; a memory having stored thereon instructions that when executed by the at least one hardware processor cause the at least one hardware processor to perform steps comprising: a) accessing a first image from the memory, the first image comprising a lens edge image or a lens surface image of a first ophthalmic lens; b) accessing a trained convolutional neural network (CNN) from the memory, the trained CNN having been trained on lens images of ophthalmic lenses in which each of the ophthalmic lenses is either a good lens or has at least one lens defect; c) generating class activation map (CAM) based on the first image and outputting the CAM with a defect region; d) labelling the defect region on the CAM with at least one of a heatmap and a bounding box to define a labeled CAM; and e) generating and outputting a classification for the first image, the classification based at least in part on the defect region, the classification being one of a plurality of lens surface defect classes or one of a plurality of lens edge defect classes.

Yet another aspect of the invention is a method for inspecting ophthalmic lenses and assigning classification to images of the ophthalmic lenses comprising: a) identifying a region on a first image to analyze for lens defect by processing the first image with an artificial intelligence (AI) network implemented with a hardware processor; b) generating a CAM based on the first image and outputting the CAM with a defect region; c) labelling the defect region on the CAM with at least one of a heatmap and a bounding box to define a labeled CAM; d) generating and outputting a classification for the first image with the AI network, the classification based at least in part on the defect region, the classification being one of a plurality of lens surface defect classes or one of a plurality of lens edge defect classes; e) identifying a region on a second image to analyze for lens defect by processing the second image with the artificial intelligence (AI) network implemented with the hardware processor.

The AI network can reside on the Cloud, on a computer system having a storage memory with the first image and the second image stored thereon, or on a computer system having a storage memory not having the first image and the second image stored thereon.

BRIEF DESCRIPTION OF THE DRAWINGS

These and other features and advantages of the present devices, systems, and methods will become appreciated as the same becomes better understood with reference to the specification, claims and appended drawings wherein:

FIG. 4A shows an exemplary image augmentation by vertically flipping an original image to generate two images; and FIG. 4B shows an exemplary image augmentation by horizontally flipping the original image to generate a third image from the original image.

FIG. 6 is a flowchart depicting one configuration of preprocessing a lens surface image to generate an input ready image for the computer system.

FIG. 7 is a flowchart depicting one configuration of preprocessing a lens edge image to generate an input ready image for the computer system.

FIG. 8 shows an image depicting the lens in a cartesian coordinate system and converting the image to a polar coordinate system.

FIG. 9 shows an image in the polar coordinate system being cropped to obtain an image to the inside and outside of the lens edge.

FIG. 10 shows the cropped image of FIG. 9 being inverted from a first set of image intensities to a second set of image intensities.

FIG. 12 shows conceptual blocks of a "surface" model of the CNN along with the input and output shapes of each layer.

FIG. 13 shows conceptual blocks of an "edge" model along with the input and output shapes of each layer.

FIG. 28 shows tabulations in a table format for prediction versus ground truth on the training dataset.

FIG. 29 shows data tabulated in a table format to show performance metrics of the surface model of the present invention on the training dataset.

FIG. 30 shows tabulations in a table format for predictions versus ground truth on the training dataset for the "edge" model of the present invention.

FIG. 31 shows data tabulated in a table format to show performance metrics of the edge model of the present invention on the training dataset.

FIG. 32 shows conceptual blocks of an "edge" model along with the output shapes of each layer using an alternative CNN and FIG. 33 shows a dropout layer added to the model.

FIG. 34 shows an additional convolutional layer added to the model of FIG. 12 without a dropout layer.

FIGS. 36A, 36B, and 36C show three different sets of 64 channel-output of the first convolution operation of the first convolutional block of the CNN model of the invention for the three input images of FIG. 35.

DETAILED DESCRIPTION

The detailed description set forth below in connection with the appended drawings is intended as a description of the presently preferred embodiments of lens inspection systems provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
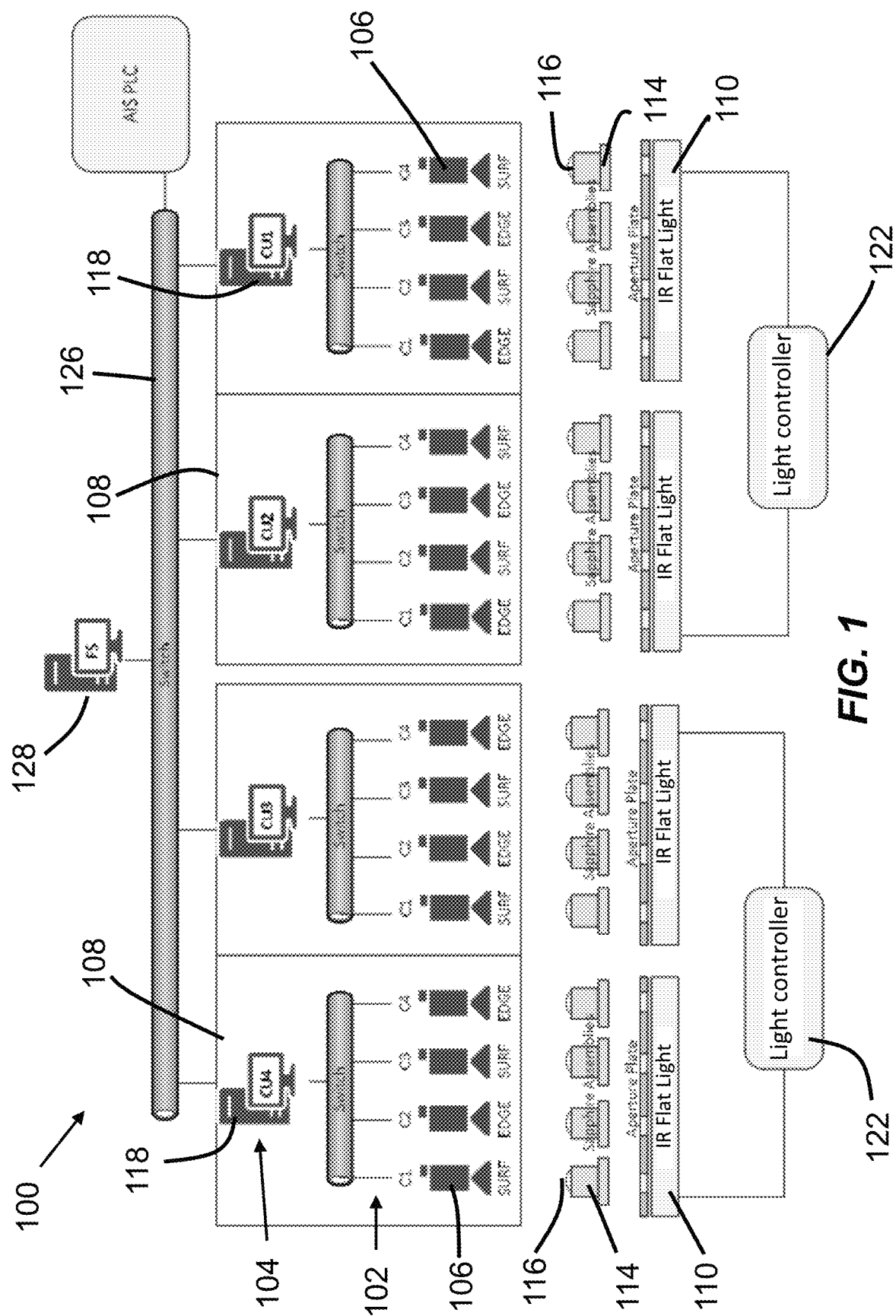
FIG. 1 is a schematic for one configuration of a lens inspection system in accordance with aspects of the invention.

With reference now to FIG. 1, a schematic diagram illustrating a lens inspection system 100 is shown, which can be used to automatically inspect lenses, such as contact lenses or other ophthalmic lenses, by inspecting images of the lenses and outputting classes or categories of defects using artificial intelligence (AI) and machine learning, such as convolutional neural networks (CNNs). The lens inspection system can be referred to as a system for classifying lens images of ophthalmic lenses. The lens inspection system 100 is structured and equipped with hardware and software to inspect lenses in their dry, or non-hydrated, state, and outputting classes or categories of defects from images acquired on the lenses in their dry state. For example, a lens can be separated from a mold having a male mold part and a female mold part and then inspected in its dry state prior to cleaning and/or hydrating the lens. In other examples, as further discussed below, the lens can be inspected while placed in a blister package in a solution, such as when the lens is in a wet state.

In the illustrated embodiment of the invention, the lens inspection system 100 inspects each lens after the lens has been removed from a lens mold and placed onto a support, such as onto a sapphire crystal support structure. Lenses passed through the lens inspection system 100 are each inspected by taking images of the lens, such as by imaging both the lens edge and the lens surface of each lens, and processing the images using CNNs loaded on computers of the lens inspection system. The lens inspection system uses CNNs to characterize defect characteristics of the lens, if any, to aid manufacturers in understanding failure modes of the lens, such as defect due to the presence of bubbles, scratches, debris, etc., as opposed to only pass/fail, which allows the manufacture to improve manufacturing processes to obtain higher yield. Contact lens that can be imaged and analyzed using the lens inspection system of the present invention include both soft silicone hydrogel contact lenses and conventional hydrogel contact lens The lens inspection system 100 generally comprises an image acquisition subsystem 102 and an image analysis subsystem 104 that operates the CNN software, as further discussed below. The image acquisition subsystem 102 comprises one or more inspection heads 108, each with a plurality of image acquisition devices 106, which may be any number of high-resolution digital monochrome cameras, such as the Basler Scout GigE scA1390-17gm digital camera with other commercially available digital cameras with sufficient resolution and processing speed being usable. Each camera 106 may be used with a fixed focal length camera lens to acquire a desired field of view from a mounted or fixed working distance with reference to a focal plane. An exemplary camera lens can include the Linos 35 mm/1.6 or 35 mm/1.8 lens with other commercially available fixed or variable lenses with sufficient focal lengths and f-stops being usable. In some examples, the lens can be a liquid lens that contains small cells containing optical ray liquid that changes shape when a voltage is applied, thus allowing fast electronic focusing that can change the focal lengths of the lens and therefore the depth of field and the focus point of the lens, thus enabling the same camera to capture a lens edge image and a lens surface image. Generally speaking, any lens and camera combination that produces a high-quality image of the lens edge, the lens surface, or both the lens edge and lens surface can be adopted with the system of the present invention.

In the illustrated lens inspection system 100 of the invention, the image acquisition subsystem 102 comprises four groups of inspection assemblies or inspection heads 108. Each inspection head 108 can have one or more illumination devices 110 or light sources, one or more image acquisition devices or cameras 106, one or more supports 114, one for each contact lens 116 to be inspected, and at least one operating computer system 118. In an embodiment, each inspection head 108 of the lens inspection system comprises an illumination device 110 and four image acquisition devices 106, which can be a camera. The illumination device 110 can comprise a single housing with a plurality of LEDs sized and structured to emit working light with the one or more cameras 106. Alternatively, the illumination device 110 can embody separate housings each with a sufficient number of LEDs to provide sufficient light for the camera 106 paired with the separated housing. Each combination of illumination device 110 and image acquisition device 106 is arranged such that the camera is in optical alignment with the paired light source. In other words, light emitted from a particular light source projects to a lens of a paired camera.

The LEDs of the illumination device 110 are operably connected to a light controller 122 so that the LEDs receive a signal, such as a current pulse, from the light controller to activate when a lens is to be imaged. In an example, the LEDs may emit NIR light at a peak wavelength of approximately 880 nm with other frequencies contemplated. In the example shown, one light controller can be programmed to operatively control illumination devices 110 of two inspection heads 108. Optionally, each illumination device can be paired with its own controller for controlling the functions of the illumination device.

The contact lens support 114 is structured to hold one or more lenses 116 to be inspected by the lens inspection system 100. In an example, a demolding table (not shown) is provided with a surface that rotates about an axis and the supports 114 are located on the table and the supports are rotatable by the table for imaging and cycling the lenses through the lens inspection system. As the demolding table rotates, each of the lenses 116 to be inspected and supported by the supports 114 passes between a camera 106 and a light source 110 to permit the camera to obtain an image of the lens to be inspected. In alternative embodiments, the lenses are inspected while each is still attached to a male mold part or a female mold part, before delensing. Thus, as the demolding table rotates so that a lens passes under a camera, the camera can be configured to capture an image of the lens while the lens is still attached to a male mold part or a female mold part.

In an example, each of the four inspection heads 108 has four cameras 106 with other number of cameras and corresponding light sources contemplated. The four inspection heads 108 can be designated as camera unit 1 (CU1), camera unit 2 (CU2), camera unit 3 (CU3), and camera unit 4 (CU4). The four cameras of each camera unit can be designated as camera 1 (C1), camera 2 (C2), camera 3 (C3), and camera 4 (C4). The cameras 112 can be staggered to focus on different field of views so that a camera within an inspection head, such as C1 of CU1, can focus on the lens edge of a lens while another camera, such as C2 of CU1, can focus on the lens surface of a second lens.

In an example, camera units CU1 and CU2 can be arranged with cameras to image similar sequence of lens profile and camera units CU3 and CU4 can be arranged with cameras to image similar sequence of lens profile so that the lens inspection system 100 can capture two sets of eight images (i.e., CU1 and CU2 represents a first set of eight images and CU3 and CU4 represents a second set of eight images) per imaging cycle.

As shown, each of camera units CU1 and CU2 is arranged to capture a lens edge image with camera C1, a lens surface image with camera C2, a lens edge image with camera C3, and a lens surface image with camera C4 of four different lenses. Then after the eight lenses are imaged by camera units CU1 and CU2, the lenses located on the supports are indexed to camera units CU3 and CU4, which have cameras 106 that are staggered to take the other one of the lens edge image or lens surface image of the same eight lenses captured by the camera units CU1 and CU2. Thus, each of camera unit CU3 and CU4 is arranged to capture a lens surface image with camera C1, a lens edge image with camera C2, a lens surface image with camera C3, and a lens edge image with camera C4 for the same corresponding four lenses that were imaged by camera units CU1 and CU2. Together, the two sets of inspection heads CU1/CU2 and CU3/CU4 are configured to capture a lens edge image and a lens surface image of each contact lens to be inspected by the lens inspection system 100.

As a specific example, C1 of CU1 is configured to take a lens edge image of lens-A and C2 of CU1 is configured to take a lens surface image of lens-B. When the demolding table is rotated and the lenses captured by CU1 is indexed to CU3, C1 of CU3 is configured to take the lens surface image of lens-A and C2 of CU3 is configured to take the lens edge image of lens-B. The camera units are thus staggered so that each lens to be inspected by the system will have two images acquired by the system, a lens edge image and a lens surface image of the lens. Lens-A will therefore have a lens edge image captured by C1 of CU1 and a surface edge image captured by C1 of CU3 while lens-B will have a lens surface image captured by C2 of CU1 and lens edge image captured by C2 of CU3. The captured images are stored locally on each respective camera's memory chip. The captured images are then transferred to the one or more computer systems 118, such as to a hard drive of a computer, which can operate different AI models, such as different CNN models, for analyzing and classifying lens edge images and lens surface images of the captured images. In some examples, the captured images can be transferred to one or more external memory devices, such as flash drives, portable hard drives, data disks, etc., external to the computer system.

An AI model running on a computer can then pull data from the one or more external memory devices and then process the data, such as inspect and classify the stored lens images with one or more lens defect categories.

In the illustrated lens inspection system 100 of the invention, the inspection heads 108 are responsible for acquisition of electronic or digital images of the lenses passing through the demolder. Each inspection head 108 is capable of inspecting all four lenses at its station within one machine index period. The four inspection heads 108 provide the capacity to acquire two images of every lens passing through the lens inspection system.

The four inspection heads 108 are structured to create two distinct views of different portions, such as an edge view and a surface view, of each lens. The two views will correspond to an image of a single lens. In edge view, the plane of focus coincides, or nearly coincides, with the edge of the lens so that edge defects or abnormalities at or near the edge are detectable. The image obtained of the edge of the lens is an image of the entire lens edge. In other words, the image is a single, complete image of the lens edge. In the illustrated embodiment, the lens is inspected with its edge down on a window, such as a sapphire window.

In the surface view or for images of the lens surfaces, the plane of focus of the camera is raised to intersect the lens above its edge so that surface defects are detectable. The surface view of the lens provides a single, complete view of the lens surface. In one embodiment, the distance between the lens of the camera and the ophthalmic lens is set so that the entire surface of the lens (e.g., the portion of the lens that is spaced apart from the lens edge) forms a single image. The depth of focus may also be restricted such that any debris that collects on the inspection window does not appear in sharp focus in surface view. This approach of obtaining a surface and edge view of the lens can overcome the high false rejection rate that is present in inspection systems that utilize a single high depth of field view in acquiring the lens images, which can incidentally capture debris in the image. The demolder of the inspection system described herein may also include a cleaning station in the event that excess debris accumulates. In addition, the inspection system may include a device to deliver ionized air to the lens to help reduce the likelihood of contaminants on the lenses.

The image analysis subsystem 104, or inspection platform, comprises one or more operating computers or computer systems 118 that are in communication with the image acquisition subsystem 102 so that the computers can receive images acquired by the cameras 112 of the image acquisition subsystem 102 and then analyze and output results using AI. Additional computer components may be provided to permit data entry, such as a keyboard or mouse, data display, such as a monitor, network switches, modems, and power supplies. Each computer system 118 can have hardware, such as a processor, and a memory for storing the AI software and the images to be analyzed. The elements of the inspection platform may be provided in one or more cabinets. The elements of the inspection platform may be wired together to permit electrical communication.

An exemplary imager analysis subsystem 104 can comprise a Windows-based computer 118 operating on a Windows 10 Enterprise operating system or equivalent. Each computer system 118 should have sufficient operating speed, power, and memory to process large image data and sufficiently robust to handle continuous use, which batch use contemplated. The images captured by each inspection head 108 can be analyzed using CNNs residing on the computer 118. In an example, each computer can operate at least two different CNN models, one for analyzing lens edge images and the other for analyzing lens surface images. The computer system, operating the CNNs, can then report or output defect characteristics of the lens images to the programmable logic controller 126, which can then communicate to a networked supervisory control and data application (SCADA) system comprising a computer 128 for process supervision, as further discussed below.

Each computer system 118 is configured to store image data, data results regarding the images, collates the data, communicates with the SCADA system, analyzes the image data to determine a defect class among several classes for each image, and communicates with one or more remote computers 128. The operating computers 118 provide an interface between the SCADA and the camera units 106. For example, commands issued at the SCADA can be passed to the camera units 106 for execution, and reports generated by the camera units can be passed to the SCADA. In exemplary embodiments, the one or more remote servers 128 can access image data on the operating computers 118 and can analyze the image data on the remote servers' own computing platform. In still yet other examples, image data are stored on the cloud and either the operating computers 118 and/or the one or more remote servers 128 can analyze the image data locally.

Additional aspects of the image acquisition system 100 are described in U.S. Pat. No. 7,256,881 to Leppard et al., the contents of which are expressly incorporated herein by reference as if set forth in full. Specific aspects of the machine learning and AI used to analyze and characterize image data acquired by the lens inspection system are further discussed below.

Figure 2:
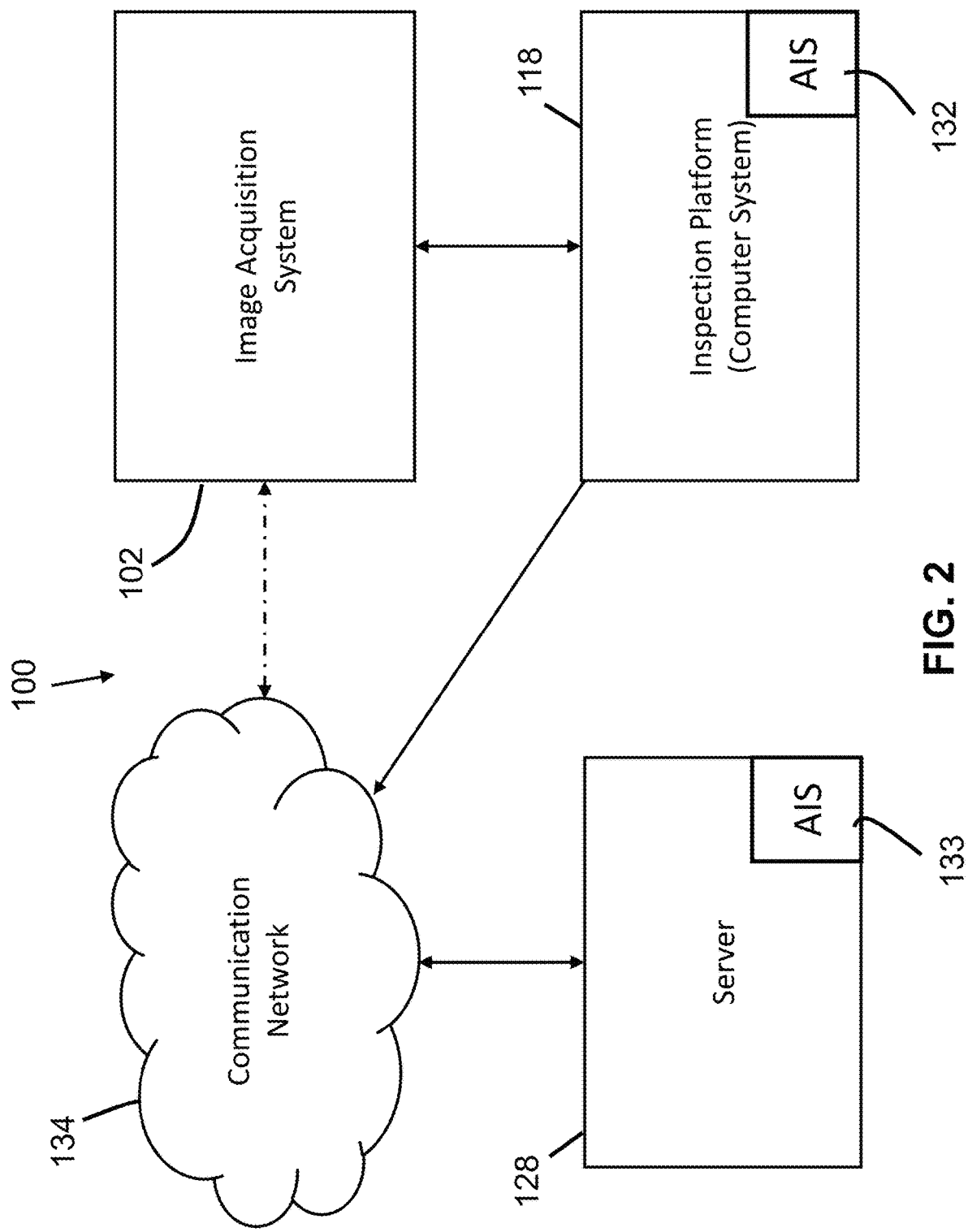
FIG. 2 is another schematic for one configuration of the present disclosure using a computer system.

With reference now to FIG. 2, a schematic diagram depicting the lens inspection system 100 for automatically detecting contact lens defect classifications using image data and machine learning in accordance with aspects of the invention is shown. A computing device or computer system 118 can receive a lens edge image and lens surface image data of each lens to be inspected from the image acquisition system 102. In some configurations, the image acquisition system 102 may comprise a plurality of inspection heads each comprising a plurality of cameras for acquiring a lens edge image and a lens surface image for each ophthalmic lens to be inspected. In some embodiments, the computing device 118 can execute at least a portion of an automatic identification system (AIS) 132 to automatically classify lens defects. In an example, the computing device 118 can execute at least two different AI models, such as two convolutional neural networks (CNNs), to determine whether a lens edge image represents a good lens or contains one of several lens edge defect categories with the first of two AI models and whether a surface edge image represents a good lens or contains one of several lens surface defect categories with the second of two AI models. That is, the memory on the computing device has stored thereon or therein instructions that when executed by at least one hardware processor cause the at least one hardware processor to operate the CNNs to perform several tasks, including access data files, analyze data files, perform analysis of the data files, and provide outputs indicative of defects or state of the ophthalmic lenses represented by the data files.

In an example, the automatic identification system 132 comprises software drivers and libraries for analyzing image data. An exemplary software driver can be the Python interpreted high-level programming language operating with a NVIDIA Cuda compiler driver compiling one of several libraries that have been modified in a process called transfer learning. The libraries can include the cuDNN SDK deep learning GPU acceleration library, TensorFlow open-source software library for developing and evaluating deep learning models, Keras open-source software library, NumPy open-source software library for working with array and matrix data structures, matplotlib open-source software library for image display and annotation, or graphs display, and OpenCV open-source library for processing images to identify objects and characteristics. In exemplary embodiments, convolutional neural networks (CNNs) are used as deep-learning models for vision applications to classify a plurality of classes of lens edge and lens surface defects. In using and training a CNN model, the learned pattern in a certain location of an image, as an example, can be recognized anywhere else in the image. Initial convolutional layers can learn small local patterns, such as edges and textures of a lens image, whereas later layers can learn larger patterns made of features learned by the initial layers.

In some embodiments, the computing system 118 can communicate information about the image data received from the image acquisition system 102 to a server 128 over a communication network 134, which can execute at least a portion of an automatic identification system 133. In such embodiments, the server 128 can return information to the computer system 118, the information indicative of an output of the automatic identification system 133, which can be one of several categories or classes of defects.

In some embodiments, the computing device 118 and/or the server 128 can be any suitable computing device or combination of devices, such as a desktop computer, a laptop computer, a smartphone, a tablet computer, a wearable computer, a server computer, a virtual machine being executed by a physical computing device, etc. In some embodiments, the automatic identification system 132, 133 can classify a defect on a lens surface image as one of eight possible defects and can classify a defect on a lens edge image as one of three possible defects, using convolutional neural networks (CNNs) previously trained as a general image classifier.

In some embodiments, the image acquisition system 102 of FIG. 1 is the image source for supplying image data to the computer device 118 and/or to the server computer 128. In some embodiments, the image acquisition system 102 can be housed locally with the computing device 118. For example, the image acquisition system 102 can be incorporated with the computing device 118. In other words, the computing device 118 can be configured as part of a device for capturing and/or storing images from the image acquisition system 102. In another example, the image acquisition system 102 can be connected to the computing device 118 by a cable, a direct wireless link, etc. Additionally or alternatively, in some embodiments, the image acquisition system 102 can be located locally and/or remotely from computing device 118 and can communicate image data to the computing device 118 and/or to the server 128 via a communication network 134.

In some embodiments, the communication network 134 can be any suitable communication network or combination of communication networks. For example, communication network 134 can include a Wi-Fi network (which can include one or more wireless routers, one or more switches, etc.), a peer-to-peer network (e.g., a Bluetooth network), a cellular network (e.g., a 4G network, a 4G network etc., complying with any suitable standard, such as CDMA, GSM, LTE, LTE Advanced, WiMAX, etc.), a wired network, etc. In some embodiments, the communication network 134 can be a local area network, a wide area network, a public network (e.g., the Internet), a private or semi-private network (e.g., a corporate intranet), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, communications systems for providing the communication network 134 can include any suitable hardware, firmware, and/or software for communicating information over communication network 134 and/or any other suitable communication networks. For example, communications systems can include one or more transceivers, one or more communication chips and/or chip sets, etc. In a more particular example, communications systems can include hardware, firmware and/or software that can be used to establish a Wi-Fi connection, a Bluetooth connection, a cellular connection, an Ethernet connection, etc.

Figure 3:
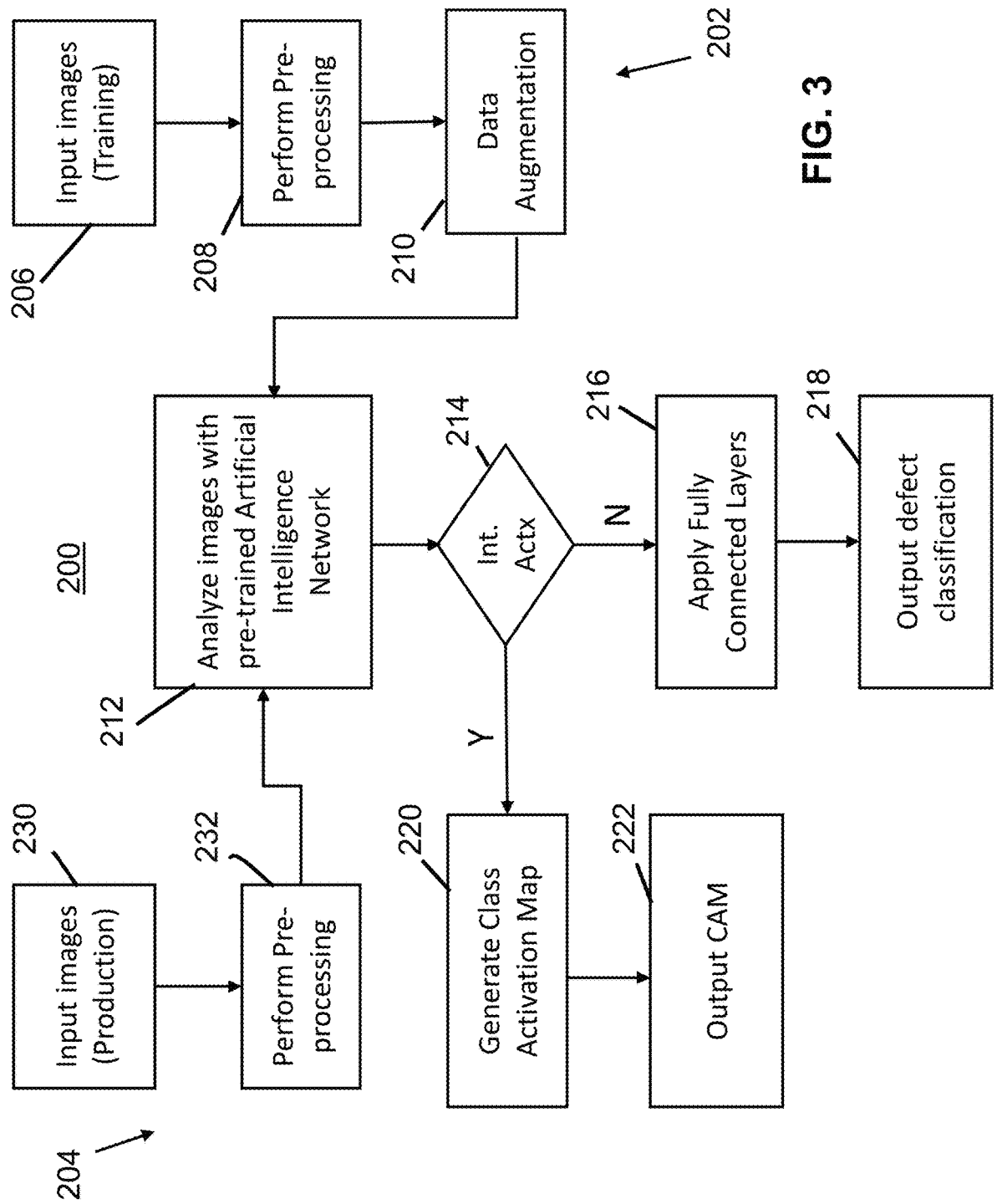
FIG. 3 is a flowchart depicting one configuration of the disclosure for identifying defects in lenses and outputting class of defects and optionally labeled intermediate activation images.

Referring now to FIG. 3, a flowchart 200 showing one configuration of the lens inspection system of the present invention is depicted. The flow chart 200 shows two different input paths for providing image data to the image analysis subsystem, which includes a first input path 202 for providing image input for training and validating and a second input path 204 for providing image input for prediction, such as for inputting production image datasets. Specific aspects of the different steps identified in FIG. 3 are shown and discussed below with referenced to FIGS. 4-41.

As previously raised, transfer learning is a technique in which an AI model architecture has already been trained on a problem, such as to detect real objects, and the model is reused for a different problem. During training of the pre-trained model for re-use on a different problem, a very large number of the layers or blocks of the model is frozen, which means the weights of the different layers or blocks are locked so that further training cannot change them while other layers are unfrozen to learn new tasks. The focus in transfer learning is on training only a small number of the top layers of the model so that the re-trained layers recognize new parameters or problems for which they are being trained, with a very small learning rate so that no major changes could happen sharply. FIG. 3 therefore represents an overview of a process flow diagram for first training and validating the model to analyze and classify different lens defects and then using the re-trained model to perform prediction of production lens image datasets.

With reference to FIG. 3, a process flow for training an AI model, and more particularly a CNN model, is shown. The process is applicable for different AI models, such as applicable for a CNN "edge" model as well as a CNN "surface" model. The model can be trained by inputting training datasets to the AI model at step 206. The training datasets can be acquired from an imaging source, such as the image acquisition system 102 of FIG. 1, or from a database of previously acquired images. Accessing the images for use as training datasets can include acquiring the images with the image acquisition system 102 or can include accessing or otherwise retrieving previously acquired images that are stored in the computer system, in a storage memory, or other suitable data storage devices, such as on a server or the Cloud. The accessed images can include both lens edge images and lens surface images of contact lenses that have been imaged by the image acquisition system. In an example, a first AI model, such as a first CNN model, is trained using just lens edge image datasets and then separately a second AI model, such as a second CNN model, is trained on just lens surface image datasets. The training image datasets include images with different defect types for lens surface defects and lens edge defects, as further discussed below. In examples where a single camera captures both a lens edge image and a lens surface image, a single AI model instead of two separate models can be trained to analyze lens surface defects, lens edge defects, or both to then generate lens surface defect classes, lens edge defect classes, or both. Each training dataset would therefore include both lens edge images and lens surface images with lens surface defects and lens edge defects. In an example, a library of previously acquired images were used to train the model over several epochs or steps, as further discussed below. In an example, the model architecture is a convolutional neural network (CNN) for image classification, and specifically a VGG Net with other deep neural networks for image processing contemplated, such as LeNet, AlexNet, GoogLeNet/Inception, and ResNet, ZFNet.

At step 208, the images undergo preprocessing to obtain usable input images to the model. The purpose of preprocessing is to reduce the complexity of the classification problem and the space or size of the input, such as the width and height of the image, which decreases the training and prediction duration, and the number of images required for training. Preprocessing of a lens surface image and preprocessing of a lens edge image can involve similar or different requirements, as further discussed below. In other examples, preprocessing of the image datasets is not required, except for normalization to generate same input file sizes, before the datasets can be accessed for inputting into the CNN models. CNN models do not require any preprocessing of the input images.

At step 210, data augmentation is performed to at least some but preferably all of images in the image datasets to increase the total number of images in the pool for use to train the CNN models. Data augmentation involves performing a variety of operations to each actual, real or original image to create artificial images, which are then added to the dataset. The operations include flipping, rotating, adjusting the color and brightness of the image, rescaling, denoising, cropping to adjust centering, etc. In some examples, the data augmentation may be performed in real-time on the preprocessed images before they are input into the AI network. The original image may be included or excluded from the dataset.

FIG. 4A shows an original image on the left side and an image on the right side that has been augmented by performing a vertical flip of the left image. FIG. 4B shows an original image on the left side and an image on the right side that has been augmented by performing a horizontal flip of the left image. Thus, from the same original image, three total images are obtainable by flipping the original image horizontally and vertically.

At step 212, images from the datasets, which include images derived from data augmentation, are then input into the CNN model to train the model in a process called transfer learning. The CNN model can reside on a local computer, on a network computer, on a remote server, or on the Cloud and accessible through an App or an internet dashboard. As further discussed below, this step involves locking several of the low levels of the model, training the model with a learning rate, unfreezing different layers of the model, re-training the model with a yet different learning rate to avoid quick and sudden changes to the model, assessing model performance, and re-training as necessary based on the accuracy or other factors over a training period. For example, and as further discussed below, the convolutional base can be pre-initialized with the pre-trained weights, whereas the densely connected layers of the CNN model can be randomly initialized. The convolutional base's weights can be frozen during the training so that their values are not allowed to be affected by the training on the current dataset.

The CNN model of the present invention has three types of layers, as further discussed below, which include convolutional layers, pooling layers, and fully connected layers. The fully connected layers at step 216 form the last few layers in the network and is often described as the feed forward neural networks. The input to the fully connected layers is the output from the final pooling or convolutional layer, which is flattened and then fed into the fully connected layers. After passing through the fully connected layers, the model uses an activation function to get probabilities of the input being in a particular class or classification, at step 218. That is, when an image to be analyzed is fed through the CNN model, the output at step 218 can be a classification, such as a "scratch" classification or a "bubble" classification. Classified images from the CNN model, i.e., classified images at step 218, can be identified or called a first classified image, a second classified image, a third classified image, etc. for the batch of preprocessed images analyzed by the CNN model.

However, the final output at step 218 is typically not an annotation of where or how the scratch or bubble was found on the analyzed image. Thus, back at step 214, the lens inspection system of the present invention allows the user to review intermediate activations of the model to gather indications of how or what part of the image the various layers of the model before the fully connected layers used towards activation of the predicted class. Utilizing images from these intermediate activations can provide the trainer or user with valuable knowledge for how to better train the model for optimum performance, as further discussed below.

When prompted, the present lens inspection system allows the user to toggle or request the computer system running the models to generate class activation maps or images from the various layers of the model at step 220. These images are generally abstract in nature but show different regions of each image that different layers of the CNN model weighed to the activation of the predicted class. Class activation map or CAM can be used during training and production to understand whether the model has succeeded in learning the true indicators of the defects to give visual feedback to users on the user interface. Class activation maps are 2D grids of scores associated with a specific output class, computed for every location in an input image. They show how intensely the input image activated each class, therefore being helpful for understanding which parts of the image led the network to its final classification decision.

At step 222, the system can output images as heatmaps or CAMs with each heatmap assigned colors to pixels proportional to their level of importance in the activation of the predicted class. The relatively brighter colors of each image show locations indicative of parts of the image that led the network to its final classification decision. Alternatively or additionally, each output CAM image can be labeled with an outline or bounding box, such as a square, a circle, or a rectangular shape, over the region or regions of the image that led the network to its final classification decision. Using the output CAM can help to assess whether the algorithm is learning the correct predictors for each defect category or classification. Since the final classification or output of the AI network includes "Good Lens" as a classification, the term "defect region" is understood to broadly mean a region that the convolutional layers analyzed that factored into the model's final classification and can include a lens with a physical defect, such as bubble or scratch, or a good lens with no physical defect.

During production, images of the produced lens can be analyzed in the now trained CNN model via process 204. At step 230, production lenses are imaged, which includes imaging a lens edge image and a lens surface image of each lens to be inspected. These images are then preprocessed at step 232 and the preprocessed images serve as input images to the CNN model. The purpose of preprocessing is to reduce the complexity of the classification problem and the space of the input, such as the width and height of the image, decreases the prediction duration. The images input into the model are analyzed by the model at step 212, which uses convolutional and pooling layers to process the images. The output from these layers is then fed to the fully connected layers to classify the data for the image into one of different defect classes at step 216. At step 218, the model outputs the final classification of the analyzed image, such as classifying the image as being good, scratch, bubble, etc., as further discussed below.

Figure 5:
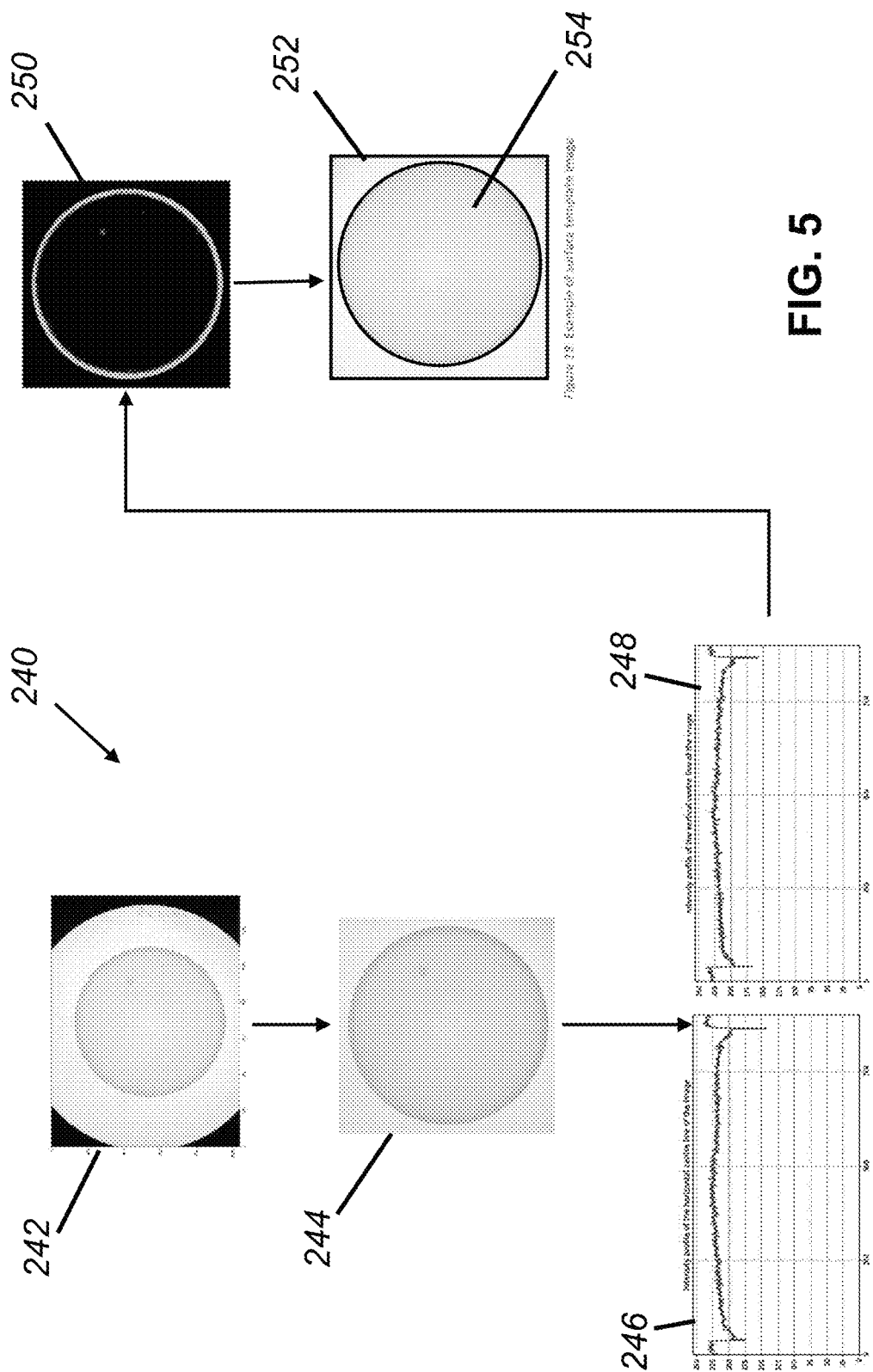
FIG. 5 is a flowchart depicting one configuration of the disclosure for generating a template from which training datasets, validating datasets, and production datasets can be created.

With reference now to FIG. 5, a process 240 for manually creating templates from which surface and edge images can be created is shown. The template creation process 240 is preferred prior to performing any preprocessing 208, 232 of the images. The templates serve as means for normalizing potential variations of the images taken by the multiple image acquisition devices or cameras 106 (FIG. 1). For example, when utilizing eight cameras to capture lens edge images and eight cameras to capture lens surface images, there can be slight differences in the distance between the cameras and the sapphires used as supports for the lenses. These differences can lead to a lens appearing a few pixels larger or smaller and not consistent across the sixteen cameras.

The template creation process 240 starts with a raw image at step 242, which can be a surface or an edge image. The image is then manually cropped at step 244 to enhance the region of interest (ROI) and to discard less important peripheral regions of the image. The cropped image is then subjected to intensity analysis to determine the appropriate threshold values for the isolation of the lens' blob or edge contour of the lens. At step 246 the intensity profile of the horizontal center line of the image is plotted and at step 248 the intensity profile of the vertical center line of the image is plotted.

At step 250, the image is thresholded using the threshold values of steps 246 and 248. That is, the threshold values that indicate the lens' blob or contour are isolated to define the lens' blob at step 250. Then at step 252, an ellipse is fitted around the contour of the lens and its coordinates at the center, lengths of the axes, and orientation angle are written to a text file, such as a "csv" file, to be read during preprocessing. The image template 254 formed at step 252, and similar image templates developed for other cameras 106 (FIG. 1) used to capture the images, and the coordinates developed for the template can then be applied to images taken by the same camera to ensure input data uniformity and consistency for use with the CNN models of the present invention.

With reference now to FIG. 6, a process 260 for preprocessing surface images is shown. The preprocessing process 260 is applied to each image to be inspected by the lens inspection system of the present invention to reduce the complexity of the classification problem and the space of the input, which can decrease the training and prediction duration of the CNN model, and the number of images required for training.

The preprocessing process 260 starts with finding the contact lens inside the image at step 262. The image, as used herein, can be a training image or a production image, which is understood as an image of a lens produced for wearing by a user for optical corrections. Template matching is used to locate the lens' center of the training image or the production image inside the original image. The template image is obtained by the template process 240 of FIG. 5. In an example, the location of the lens' center relative to the upper left corner of the image is obtained during preprocessing.

At step 264, the image is cropped to produce a square image equal to 900 pixels on each side with a region of interest (ROI) centered relative to the square image, or the image can be cropped so that the square shape image is centered around the lens. In an example, the 900 pixels value for both the width and the height of the ROI can be selected empirically based on the observation that the radius of the lens is below 450 pixels.

The intensity of each pixel of the cropped image is then inverted at step 266, which changes the image so that lighter shades appear darker and darker shades appear lighter. Inversion allows pixels of high intensities to be selected and carried over to the following layers of the model whereas dark pixels are discarded. As pixels representative of defects, which represent meaningful information for the classification process described herein, are usually dark, inverting the intensities of the original image aides the proliferation of defects across the network to the deeper layers of the neural network. Further, since the CNN model is programmed to process color images, the inverted image at step 266, which represents a single channel, is reproduced in triplicate to represent the colors RGB, which amounts to obtaining a 3-channel image at step 268. The color input requirement for the model is artificially satisfied by replicating the content of the single channel to two additional channels. The preprocessing process 260 is repeated for each lens surface image to be analyzed by the lens inspection system of the present invention.

With reference now to FIG. 7, a process 270 for preprocessing lens edge images is shown. The preprocessing process 270 starts with finding the lens inside the image at step 272, similar to the process at step 262 of FIG. 6. Template matching is used to locate the lens' center of the training image or the production image inside the original image. In an example, the location of the lens' center relative to the upper left corner of the image is obtained during preprocessing.

Next, the image of the lens is converted from a cartesian coordinate system to a polar coordinate system at step 272. The polar coordinate highlights the lens edge as regions bordering the vertical color gradient, which is more readily apparent in the polar coordinate. As the edge image contains information in focus only on a narrow area around the edge, such as a few pixels towards the inside and outside of the edge, changing the coordinate system allows for a simple reduction of the lens edge's ROI. From a lens ROI of 900×900 pixels, the input to the CNN model can be reduced to 900 pixels×50 pixels. FIG. 8 shows an image in the cartesian coordinate 280 and the same image converted to the polar coordinate 282.

At step 276, a predetermined region towards the inside and the outside of the edge is cropped from the polar image, as shown in FIG. 9. This step is sensitive as the cropped portion of the image to retain relates to the exact localization of the lens inside the target image. Discrepancies between the size of the lens in the template image and the size of the lens in the target image can lead to the determined center being slightly different to the actual center of the lens. This can then cause the profile of the edge to appear like that of a pinched lens in the cropped ROI image or to be partially excluded from it.

Next, the image intensity of each pixel is inverted at step 278. This inversion produces a black and white image representing a single channel, as shown in FIG. 10. As the CNN model is programmed to process color images, the inverted image at step 278 is reproduced in triplicate to represent the colors RGB, which amounts to having 3-channel image at step 279. The preprocessing process 270 is repeated for each lens edge image to be fed to the CNN model for prediction.

Figure 11:
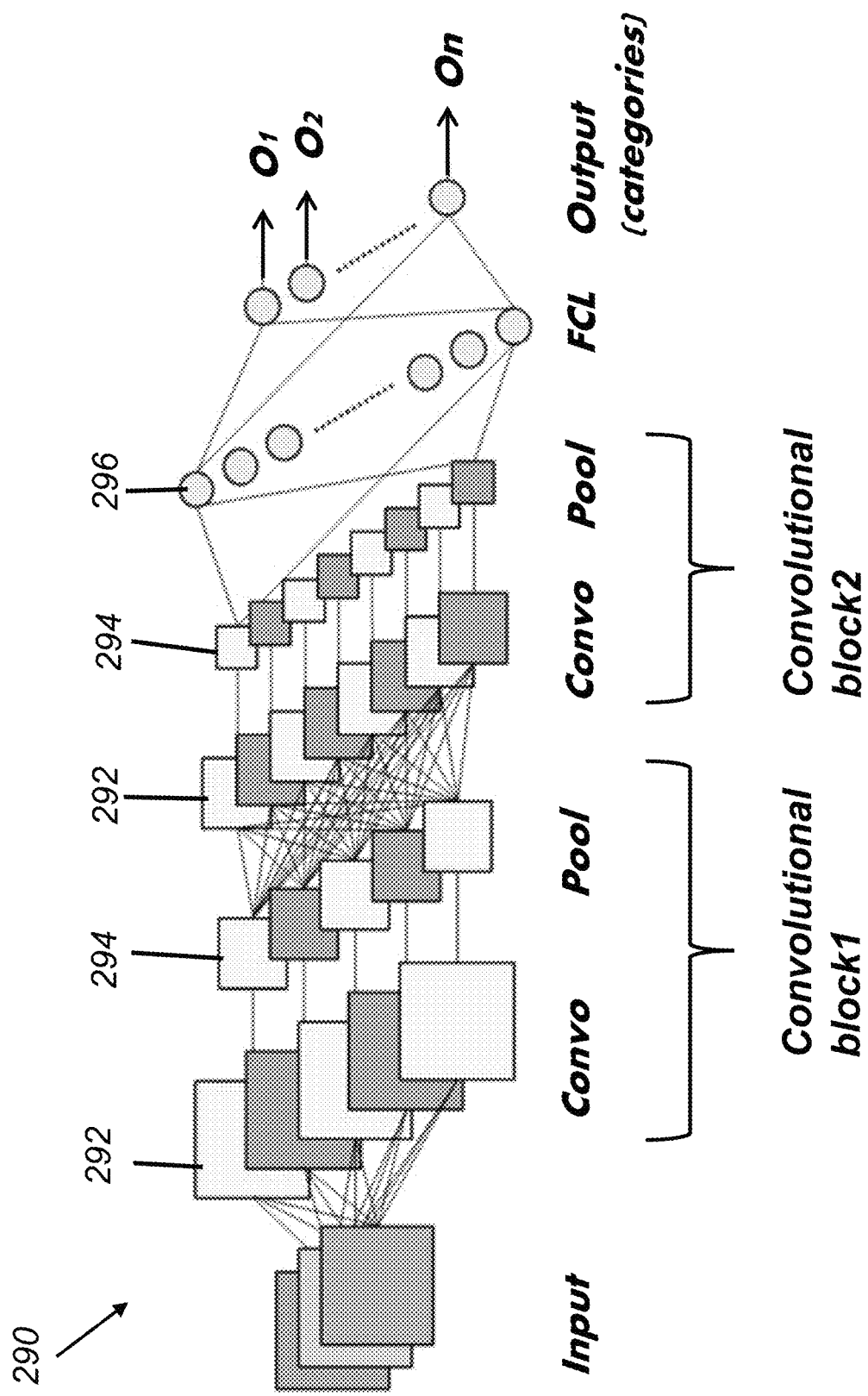
FIG. 11 is a schematic of an AI network, and more particularly a convolutional neural network (CNN).

With reference now to FIG. 11, a simplified convolutional neural network 290 in accordance with aspects of the invention comprising two convolutional layers 292, two pooling layers 294, and a fully connected layer (FCL) 296 is shown. The different layers can be grouped into two convolutional blocks (block1 and block2) with each block comprising one convolutional layer and one pooling layer. In the present invention, more sophisticated CNN models comprising 12 or more layers, such as 16 layers, 19 layers, or more layers, are utilized to analyze and characterize lens images with different defect categories. Unlike the simplified CNN model of FIG. 11, the CNN models of the present invention can comprise multiple convolutional blocks with each block having more than one convolutional layer, such as two or more convolutional layers, three or more, or four or more convolutional layers. The CNN models of the present invention are trained to classify different lens defect categories and to optionally generate labeled intermediate activation images.

In exemplary embodiments of the present invention, the selected model is a convolutional neural network (CNN) with 26 layers, similar to the CNN model of FIG. 11 but with 26 layers. FIG. 12 shows conceptual blocks of the selected model, which is a "surface" model of the CNN. The first layer of the model represents the input layer having the shape (900, 900, 3). Thus, the model will receive as input only images with a height of 900 pixels, width of 900 pixels, and 3 channels, equal an RGB images. As discussed above with reference to step 268 of FIG. 6 and step 279 of FIG. 7, the grayscale images of the present datasets have been artificially extended by replicating each image to produce three of the same images, to satisfy the 3-channel input requirement of the model.

The following 21 layers of the model are grouped in block1 to block5 and have been extracted from a well-known VGG19 CNN model. The original VGG19 model had been pre-trained on the ImageNet dataset, having an input shape of 224×224×3 and outputting prediction probabilities for 1000 different classes. In the present invention, the top layers of the pre-trained VGG19 model have been dropped (to allow the re-training for a different number of classes or categories than what the model was originally trained on and for a different shape of the input image.

These twenty (21) layers are conceptually grouped into five (5) blocks, each block consisting of several convolution layers and a last layer within the block being a pooling layer. For example, the block2 consists of two convolutions (block2_conv1 and block2_conv2) and one pooling (block2_pool). The five (5) blocks represent the convolutional base of the model.

At the end of the convolutional blocks, a flatten layer (flatten_1) and two densely connected layers (dense_1 and dense_2) have been added. The flatten layer involves transforming the entire pooled feature map matrix into a single column which is then fed to the neural network for processing. The flatten layer makes the transition between the convolutional layer and the classic NN layers, which are called densely connected layers because each neuron in a layer is connected with each neuron in its preceding and following layers. The input of flatten_1 is a 512 channels 28×28 image, which is transformed into a 401408 (512× 28×28) vector.

The two densely connected layers are also known as fully connected layers. The dense_1 layer reduces the vector to 256 neurons and dense_2 further reduces it to 8, which represents the number of classes for the lens surface defects which the model is capable of classifying, as noted in FIGS. 17-24.

FIG. 13 is similar to FIG. 12 but shows the conceptual blocks of an "edge" model. The architecture of the "edge" model is identical to that of the "surface" model. Nevertheless, due to the input image shape and the number of classes being different, the input and output shapes of each layer is different, therefore the trainable parameters' number is also significantly different. Note that the two densely connected layers of the "edge" model includes the dense_1 layer that reduces the vector to 256 neurons and dense_2 further reduces it to 3, which represents the number of classes for the lens "edge" defects which the model is capable of classifying.

During training, the convolutional base or later layers of the source model, which can be a convolutional neural network, and more specifically the VGG16 and/or VGG19 model, can be pre-initialized with the pre-trained weights. Other models usable for classifying lens defects from the Keras library include Xception, ResNet50, and InceptionV3. The densely connected layers can be randomly initialized. The convolutional base's weights can be frozen during the training so that they are not updated as the new model is trained. Each CNN layer learns filters of increasing complexity. The first layers learn basic feature detection filters, such as edges, corners, etc. The middle layers learn filters that detect parts of objects. For faces, as an example, they might learn to respond to eyes, noses, etc. The last layers have higher representation. They learn to recognize full objects, in different shapes, positions, and categories.

Figures 14, 15:
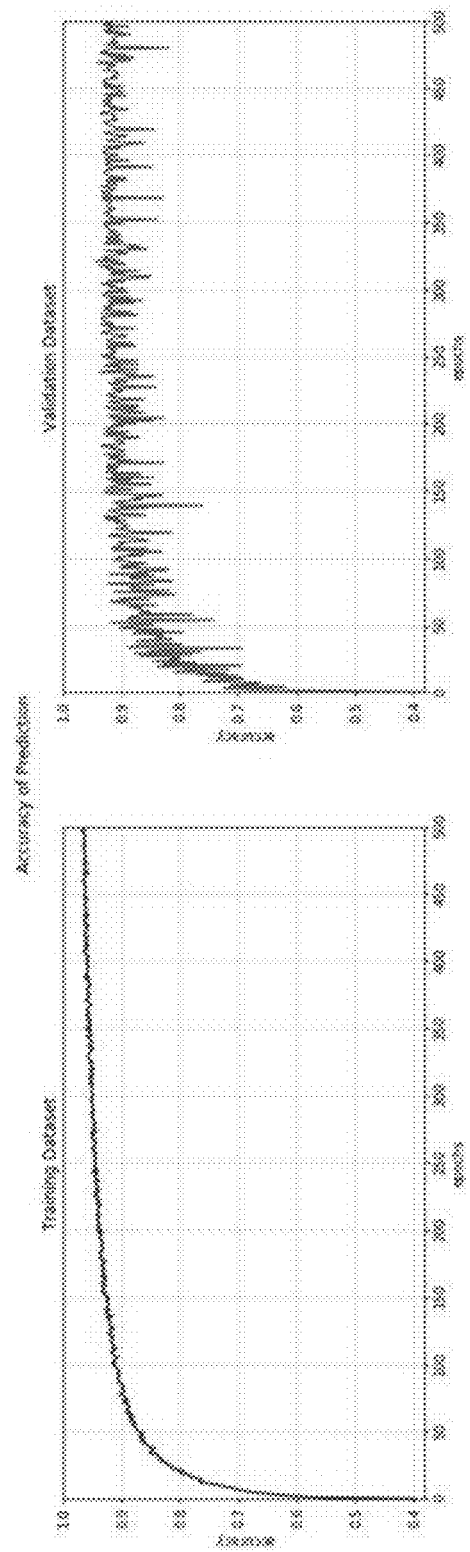
FIG. 14 shows exemplary settings used for transfer training of a pre-trained CNN model.
FIG. 15 shows how accuracy changes over range of epochs for both training datasets and validation datasets.

FIG. 14 shows the settings used for the transfer training. A total of 3,973 images was used for training the model for lens "surface" analysis. The training was performed for 500 epochs or steps. During each epoch, the CNN model can be trained over again on a different set of training data or can be trained with the same dataset so that it will continue to learn about the features of the data. The training is then validated by a validation set. The validation set is a set of data, separate from the training set, that is used to validate the model during training. This validation process helps give information that can assist with adjusting the parameters of the model. In an embodiment, the model is also simultaneously validated on the data in the validation set.

During the training process, the model will be classifying the output for each input in the training set. After this classification occurs, the loss value will then be calculated, and the weights in the model can be adjusted. Then, during the next epoch, it will classify the input again for the next training set. The model will be classifying each input from the validation set as well. The model can perform classification based only on what it has learned about the data that it is being trained on in the training set.

One of the reasons for using a validation set is to ensure that the model is not overfitting to the data in the training set. During training, as the model is validated with the validation set and the results for the validation data track the results the model is giving for the training data, then there is high confidence that the model is not overfitting. On the other hand, if the results on the training data are really good, but the results on the validation data are poor, then there is a high probability that the model is overfitting.

Figure 14A:
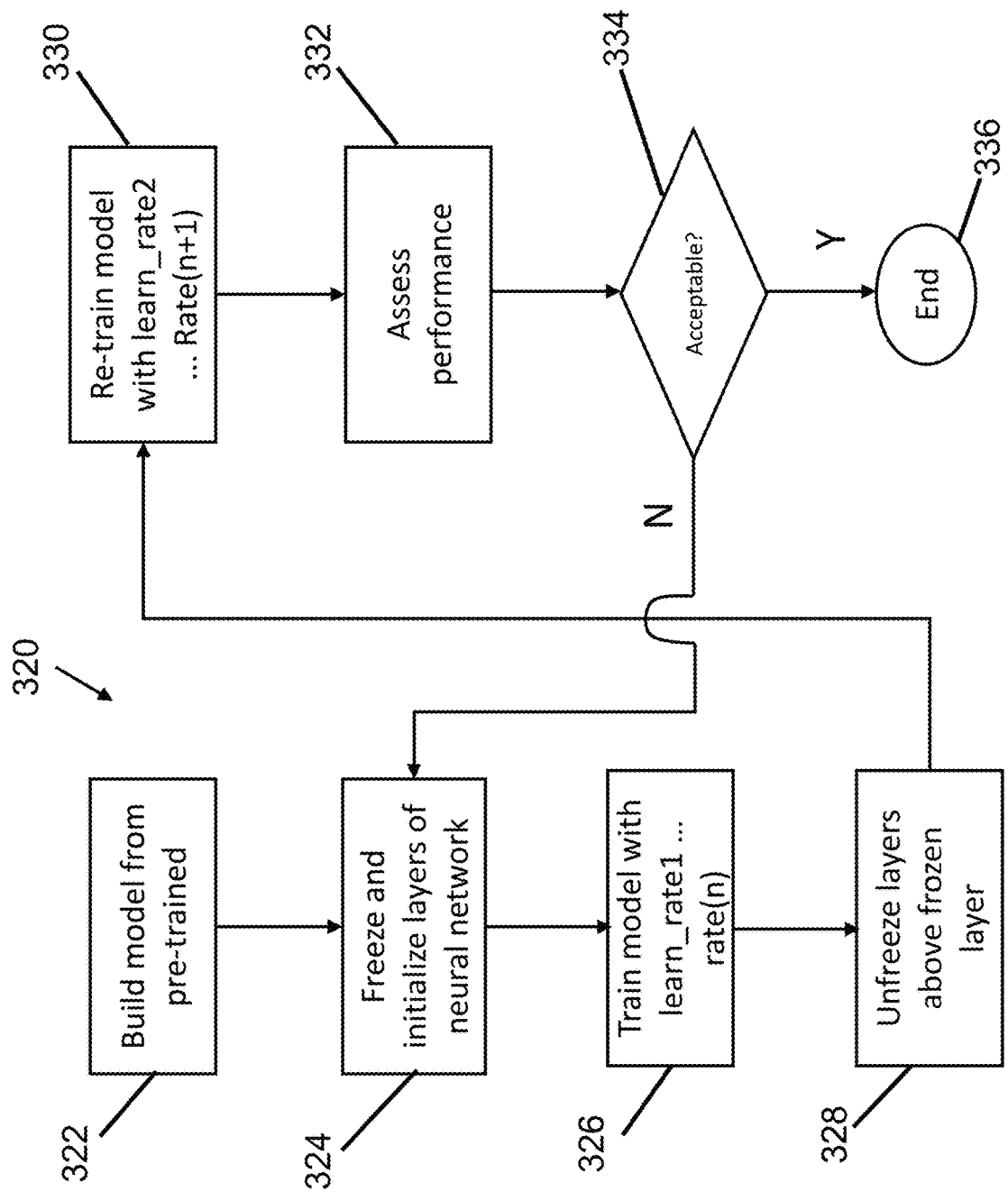
FIG. 14A is a flowchart depicting an exemplary transfer training protocol of CNN models of the invention.

Transfer learning is a process where a model built for a problem is reused for another problem based on some factors. In an example, a VGG network, such as a VGG16 Net and a VGG19 Net are trained to analyze and classify types of lens defects. FIG. 14A is a flowchart depicting an exemplary transfer training protocol for CNN models of the invention, generally designated as 320. At step 322, the model can be built from a pre-trained convolutional base with convolutional and dense layers developed to analyze and classify lens defects. Next, at step 324, the pre-trained base is locked or frozen and the rest of the model, i.e., the different neural layers, is randomly initialized. In some examples, only a few layers, such as one to four convolutional layers, are initialized at a time. At step 326, the model is trained with a learning rate learn_rate1. Preferably, the learning rate is not so fast such that the model can rapidly change and difficult to un-train or re-train. At step 328, every layer above the first frozen layer of the model is unlocked or unfrozen. Then at step 330, the model is re-trained with a smaller learning rate learn_rate2. After the model is re-trained at step 330, the results or performance of the retained model are assessed at step 332. If the results are satisfactory from factors such as accuracy, as discussed with reference to FIG. 15, loss function, as discussed with reference to FIG. 16, predicted versus ground truth, as discussed with reference to FIG. 28, and/or precision and recall values, as discussed with reference to FIG. 29, then the training can stop at step 336. If the retrained model is still performing sub-par compared to the noted factors, then the training can repeat beginning at step 324. If the steps are repeated for further re-training, only the layer from step 328 is changed, going toward the root of the model layer by layer. There is a point where performance starts to decrease. If increasing the number of images in the training dataset does not improve the model's performance, then the re-training can end at step 336.

FIG. 15 shows the accuracy's change over the training period, across the 500 epochs, for both the training dataset (left graph) and the validation dataset (right graph). As discussed above, as the model is validated with the validation dataset and the results for the validation dataset generally track the results the model is giving for the training dataset. FIG. 15 is an example obtained during several training iterations, but not necessary the final or the best accuracy. Accuracy is one metric for evaluating classification models. Accuracy is the fraction of predictions the model got right. Accuracy can be computed as the number of correct predictions divided by the total number of predictions with one (1) being perfectly accurate.

Figure 16:
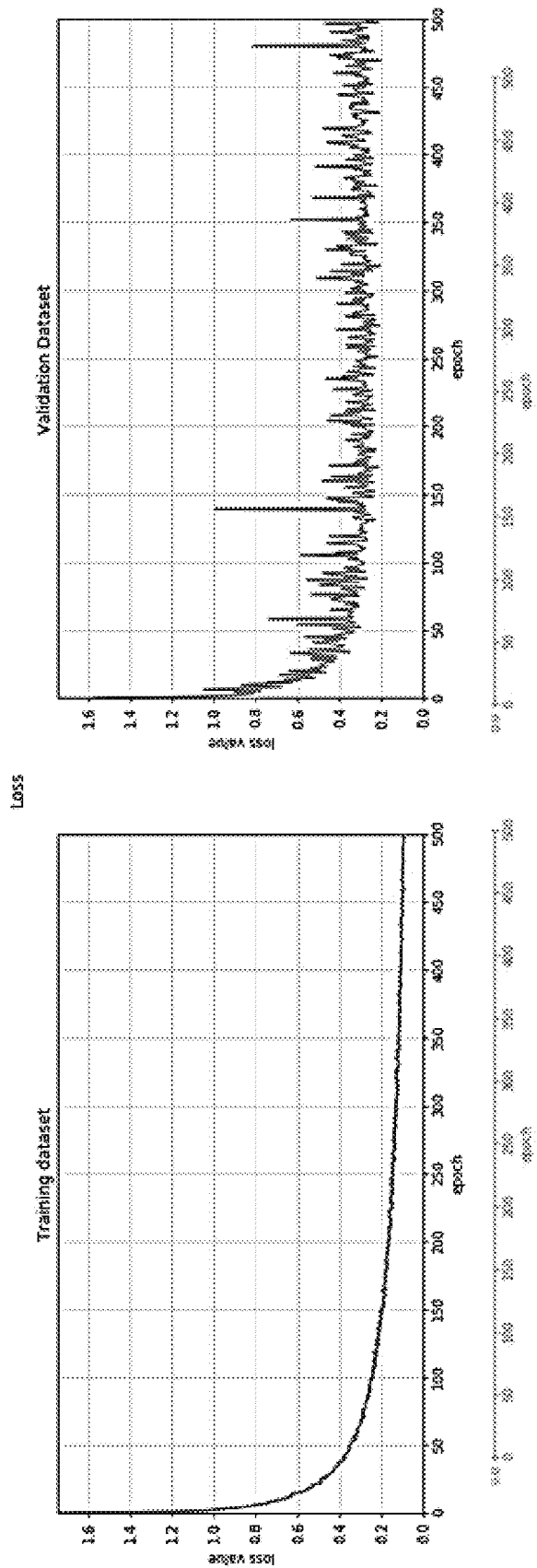
FIG. 16 shows graphs depicting the output of the loss function over the training epochs for training and validation datasets.
Figure 17:
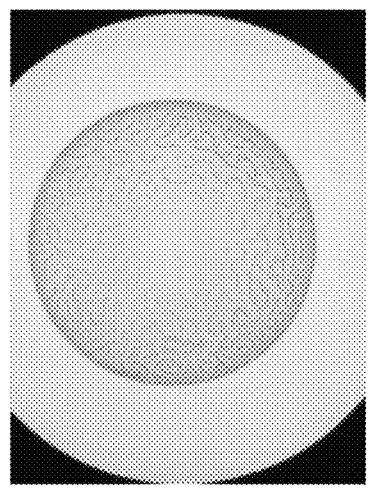
FIGS. 17-24 are images representative of eight different classes or categories of lens surface defects, which broadly cover physical defects as well as good lens.

FIG. 16 are graphs showing values of the loss function value over the training epochs for the training (left graph) and the validation (right graph) datasets. The output of the loss function can be used to optimize a machine learning algorithm. Loss function can be used as a measurement of how good a prediction the model is performing in terms of being able to predict the expected outcome. The loss is calculated during training and validation and its interpretation is based on how well the model is doing in these two sets. It is the sum of errors made for each example in training or validation datasets. Loss value implies how poorly or well a model behaves after each iteration of optimization. It measures the performance of a classification model whose output is a probability value between 0 and 1. Cross-entropy loss increases as the predicted probability diverges from the actual label. Thus, predicting a probability of, for example, 0.023 when the actual observation label is 1 would be dismal and would result in a high loss value. A perfect model would have a log loss of 0.

Figure 18:
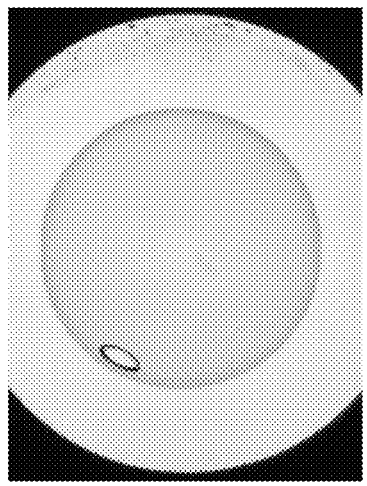
Figure 19:
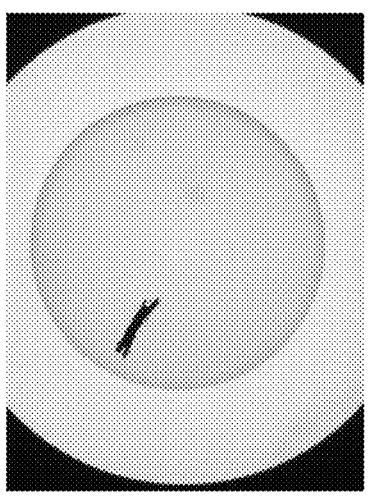
Figure 20:
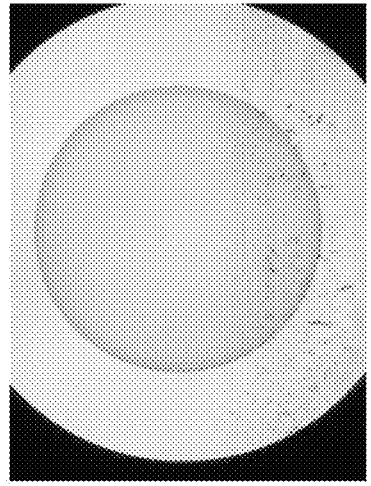
Figure 22:
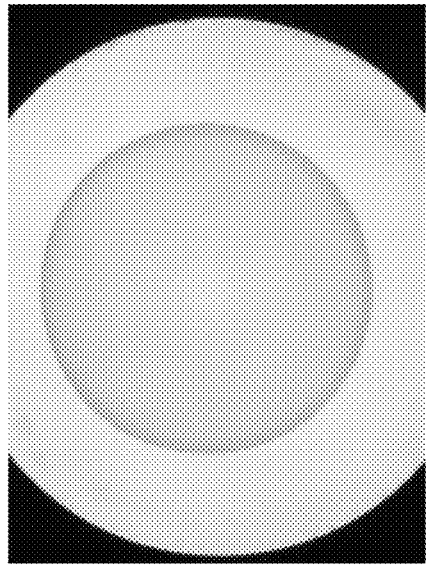
Figure 24:
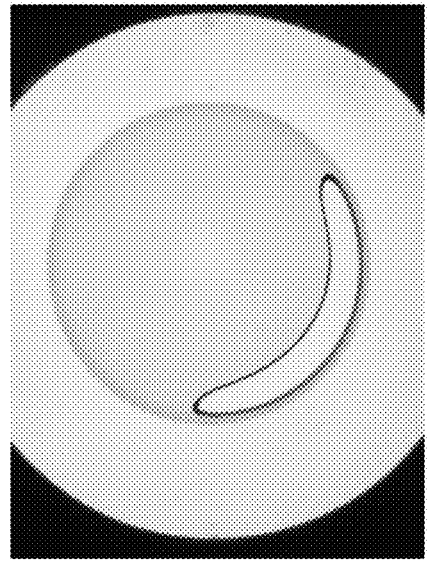
Figure 21:
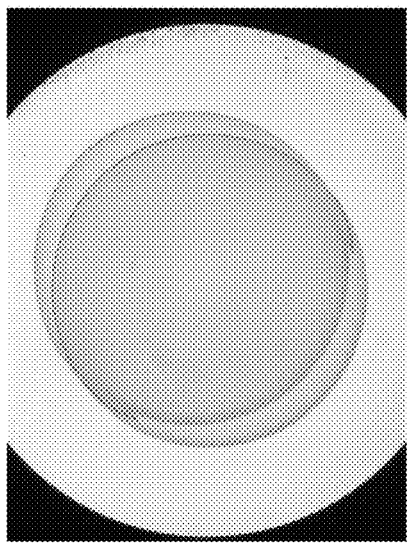
Figure 23:
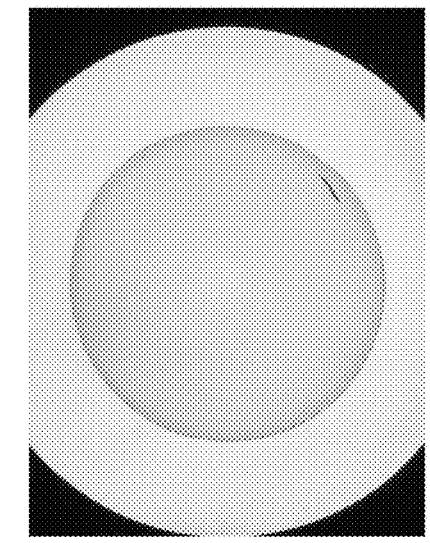

FIGS. 17-24 shows different lens surface defect types, categories, or classes that the AI models, such as CNN models, of the present invention are trained to detect and output. Starting with FIG. 17, the image shows a "braining" or "brain" surface defect pattern, FIG. 18 shows a "bubble" defect pattern, FIG. 19 shows a "debris" pattern, and FIG. 20 shows a "dirty sapphire" pattern, which is the crystal used for the support structure 114 (FIG. 1) to support the contact lens. FIG. 21 shows a "double lens" defect pattern, which is when two lenses are placed on the same support, FIG. 22 shows a "good" lens surface image (and therefore a lens with nil or minimal physical defects), FIG. 23 shows a "scratch" surface defect pattern, and FIG. 24 shows a "void" surface defect pattern.

Instead of text, the defect classes that the AI models, such as CNN models of the present invention, can output for the different lens surface defects can be designated with or using numbers. For example, "brains" can be designated as a class with a whole integer, such "0", "bubble" can be designated as a class with a whole integer, such "1"; "debris" can be designated as a class with a whole integer, such "2"; "Dirty sapphire" can be designated as a class with a whole integer, such "3"; "Double lens" can be designated as a class with a whole integer, such "4"; "Good lens" can be designated as a class with a whole integer, such "5"; "Scratch" can be designated as a class with a whole integer, such "6"; and "Void" can be designated as a class with a whole integer, such "7". In other examples, the numbers for the classes can vary and assigned a different value than as indicated. For example, "Scratch" can be designated as a class with a whole integer of "2" instead of "6". In still other examples, the defect classes that that the AI models can output for the different lens surface defects can be designated using an alpha-numeric identifier, such as LS1 for lens surface defect "Bubble".

Figure 26:
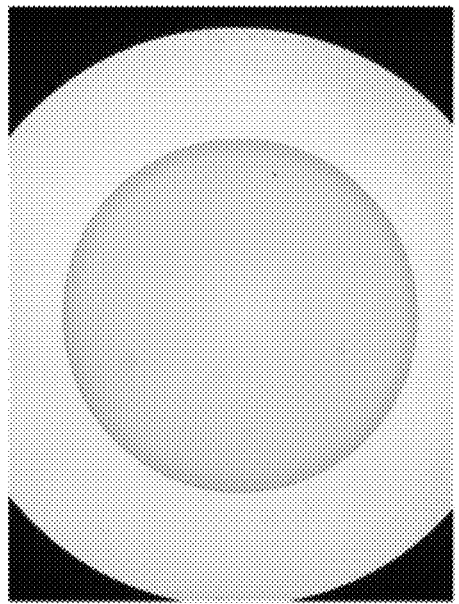
FIGS. 25-27 are images representative of three different classes or categories of lens edge defects, which broadly cover physical defects as well as good lens.
Figure 27:
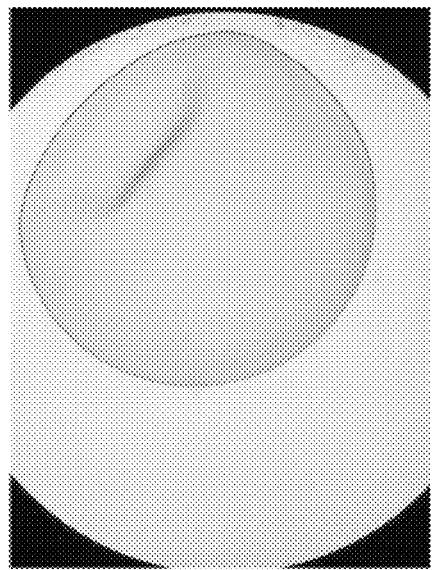
Figure 25:
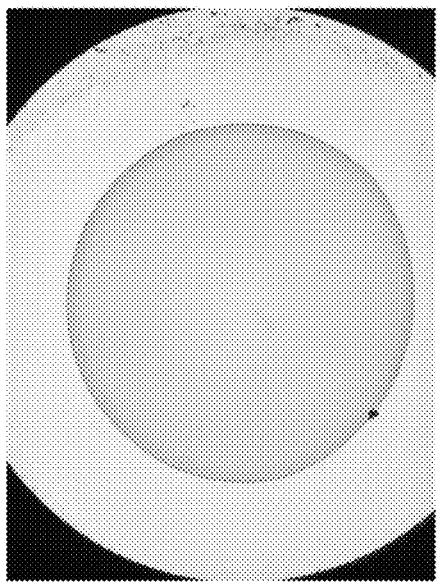

FIGS. 25-27 shows different lens edge defect types, categories, or classes that the AI models, such as the CNN models of the present invention, are trained to detect and output. Starting with FIG. 25, the image shows a "Debris" edge defect pattern, FIG. 26 shows a "GoodLens" edge image (and therefore not a defect), and FIG. 27 shows a "Pinched" edge defect pattern. Instead of text, the defect classes that the AI models can output for the different lens edge defects can be designated with or using numbers. For example, "Debris" can be designated as a class with a whole integer, such "20", "GoodLens" can be designated as a class with a whole integer, such "21"; and "Pinched" can be designated as a class with a whole integer, such "22". In other examples, the numbers for the classes can vary and assigned a different value than as indicated. For example, "Debris" can be designated as a class with a whole integer of "50" instead of "20". In still other examples, the defect classes that that AI networks can output for the different lens edge defects can be designated using an alpha-numeric designation or identifier, such as LE20 for lens surface defect "Debris".

In an example, the training and validation datasets are separated into two groups of images, one containing only lens surface images and another containing only lens edge images. The datasets for training and validating CNN "surface" models contain only lens surface images while the datasets for training and validating CNN "edge" models contain only lens edge images. In an example, the lens surface image datasets contain a plurality of images having defect types shown in FIG. 17-24, which include eight defect type categories comprising "Brains", "Bubble", "Debris", "Dirty sapphire", "Double lens", "Good lens", "Scratch", and "Void". However, the surface models can be trained on more or fewer than eight surface defect types. For example, the surface models can be trained with images with no lens, with a lens that is too small, with a lens that is too large, and/or with a lens that is too eccentric.

In an example, the lens edge image datasets contain a plurality of images having defect types shown in FIG. 25-27, which include three defect type categories comprising "Debris", "Good lens", and "Pinched". However, the edge models can be trained on more or fewer than three edge defect types. For example, the edge models can be trained with images with no lens, with a lens that is too small, with a lens that is too large, and/or with a lens that is too eccentric.

FIG. 28 shows tabulations in a table format for prediction versus ground truth for the training datasets. Ground truth is labeled on the left-hand side against the model's prediction on the right-hand side. Images labeled as ground truths represent defects that have been confirmed by human verification or inspection. For example, preprocessed or original images can be individually manually inspected and then each labeled with one or more defect classifications. In an example, the defect classifications are saved as part of the file name for each image data file. For original images, each defect type manually identified for an image is separately saved in respective classification folders. The two image types, such as lens edge image and lens surface image, can be classified with lens edge defect types and lens surface defect types and separately saved accordance to whether the images are of the particular image type and the particular defect type. Where an image is taken with an imaging system having a large depth of field, and a large aperture or large f-number, and the image has both the lens edge and lens surface in focus, the same image can be manually evaluated and classified with both lens edge defects and lens surface defects. This third category of images can be separately saved as a different category of ground truth.

These classified and categorized images can then be added to the pool of images from which the training, validation, and test sets are selected. Thus, at least some images, and preferably all images used for training, validation, and testing, can first be examined for defect types and then undergo manual evaluation to classify them with lens surface defect types or classes, or lens edge defect types or classes, or both lens surface defect and lens edge defect types or classes. During validation, as an example, if an image that has been labeled with a "scratch" is pulled from a folder and fed into the AI model that returns a "bubble" classification, the error will immediately be known.

As shown in the table format of FIG. 28, for "brain", "bubble", and "void" surface defect patterns, the model's prediction is 100% accurate compared to preprocessed images that have been manually classified and considered ground truth. For "debris" and "scratch" surface defect patterns, the model's prediction is excellent and close to 100%. The model performs well at predicting "good lenses" as well. For "dirty sapphire" and for "double lens" defect patterns, the model is less stellar but still scored well, as discussed below with reference to FIG. 29. Notwithstanding, the model can be re-trained or fine-tuned to improve, as further discussed below.

FIG. 29 shows data tabulated in a table format to show the performance metrics of the surface model on the training dataset of FIG. 28. The metrics use acronyms to indicate different measurements having the following definitions:

a. count of true positives (TP) is the number of instances belonging to class A which were correctly classified as belonging to that class;
b. count of false positives (FP)—the number of instances belonging to other classes except class A which were misclassified as belonging to class A;
c. count of false negatives (FN)—the number of instances which belong to class A, but were misclassified as belonging to other classes;
d. count of true negatives (TN)—the number of instances belonging to other classes except class A, which were not classified as class A;
e. accuracy—the number of correctly-classified instances against the number of misclassified instances, and computed as follows:
    i. Accuracy=(TP+TN)/(TP+FP+TN+FN)
f. Precision—the true positive rate, defined as:
    i. Precision=TP/(TP+FP)
    ii. Precision decreases as the number of falsely detected instances increases. Optimizing precision for the "Good Lens" class is equivalent to tightening the inspection standard, thus increasing the quality of the product.
g. Recall—the true positive rate, defined as:
    i. Recall=TP/(TP+FN)
    ii. Recall decreases as the number of missed instances increases. Optimizing recall for the "Good Lens" class is equivalent to increasing production yield.

FIG. 29 shows the model's prediction for "Good lens" scoring 0.910 in the Precisions category and 0.994 in the Recall category, which are both excellent numbers. However, if the model is fine-tuned to improve the Precision number to an even higher number, it would amount to tightening the inspection standard and decreasing the number of disposals of "Good lens".

FIG. 30 shows tabulations in a table format for predictions versus ground truths on the training dataset for the "edge" model. Ground truth is labeled on the left-hand side against the model's prediction on the right-hand side. Images labeled as ground truths represent defects that have been confirmed by human verification or inspection. As shown in the table format, for "Pinched" surface defect pattern, the model's prediction is 100% accurate. The model performs well at predicting "good lenses" as well, scoring nearly 100%. For "Debris" defect pattern, the model is less stellar but still scored well, as discussed below with reference to FIG. 31. Notwithstanding, the model can be re-trained or fine-tuned to improve, as further discussed below.

FIG. 31 shows data plotted in a table format to show the performance metrics of the "edge" model on the training dataset of FIG. 30. The metrics use the same acronyms to indicate different measurements as that of the "surface" model, discussed above with reference to FIG. 29. FIG. 31 shows the model's prediction for "Good lens" scoring 0.92 in the Precisions category and 0.99 in the Recall category, which are both excellent numbers. However, if the model is fine-tined to improve the Precision number to an even higher number, it would amount to tightening the inspection standard and decreasing the number of disposals of "Good lens".

The accuracy of the surface model on the validation dataset increases at a very slow pace after the first 150 epochs compared to accuracy on the training dataset. This could be an indication of overfitting. Another indication of overfitting of the surface model is the high confidence in one category when more than one defect is present in an image. This can be tackled by adding dropout layers and by increasing the training dataset.

The dropout technique entails randomly ignoring selected neurons during training. This means that their contribution to the activation of downstream neurons is temporally removed on the forward pass and any weight updates are not applied to the neuron on the backward pass. Dropouts are the regularization technique that is used to prevent overfitting in the model. Dropouts are added to randomly switch some percentage of neurons of the network off. When the neurons are switched off, the incoming and outgoing connections to those neurons are also switched off. This can be performed to enhance the model's learning. Dropouts should not be used after the convolution layers. Dropouts are mostly used after the dense layers or the flatten layer of the network. In an example, only about 10% to 50% of the neurons are switched off at a time. If more than 50% are switched off at a time, then the model's leaning can be poor and the predictions unsatisfactory.

FIG. 32 is similar to FIG. 12 and shows conceptual blocks of the "surface" model along with the output shapes of each layer, using a VGG16 Net model instead of the VGG19 Net model of FIG. 12. The architecture of the present surface model is similar to the surface model of FIG. 12, but with fewer layers. FIG. 33 shows a dropout layer added to the model of FIG. 32. The dropout layer can be added to randomly switch some percentage of neurons of the network off. When the neurons are switched off, the incoming and outgoing connections to those neurons are also switched off. This can be performed to enhance learning for the model.

FIG. 32 is similar to FIG. 12 and shows conceptual blocks of the "surface" model along with the output shapes of each layer, using a VGG16 Net model instead of the VGG19 Net of FIG. 12. The architecture of the present surface model is similar to the surface model of FIG. 12, but with fewer layers. FIG. 33 shows a dropout layer used with the model of FIG. 12. The dropout layer can be added to randomly switch some percentage of neurons of the network off. When the neurons are switched off the incoming and outgoing connections to those neurons are also switched off. This can be performed to enhance model learning.

Different deep neural network models have been tried and trained. Further, models were train with and without dropout layers. FIG. 34 shows layers before the output layer used with the model of FIG. 12, which is a VGG19 Net model. The model was trained without a dropout layer. Instead, another convolutional layer on top of the VGG19 Net model was applied, before the flattening operation.

In an example, to improve precision and recall values of the CNN models, fine-tuning to adapt or refine the input-output pair data available for the task can be performed. Finetuning can involve updating the CNN architecture and re-training it to learn new or different features of the different classes. Finetuning is a multi-step process and involves one or more of the following steps: (1) removing the fully connected nodes at the end of the network (i.e., where the actual class label predictions are made); (2)

replacing the fully connected nodes with freshly initialized ones; (3) freezing earlier or top convolutional layers in the network to ensure that any previous robust features learned by the model are not overwritten or discarded; (4) training only the fully connected layers with a certain learning rate; and (5) unfreezing some or all of the convolutional layers in the network and performing additional training with the same or new datasets with a relatively smaller learning rate. In an example, finetuning is used to improve the precision and recall values for good lenses for both the lens edge model and the lens surface model.

To assess whether the model is learning the correct predictors for each category, class activation maps (CAMs) can be used. CAMs can be used to ensure that the image regions which activated the output for each class are relevant for each defect category. Using CAMs allow the trainer to visualize where in the image the defect was found that lead to the classification. As a CNN model allows the effect of processing in the input image after each step of the activation until very close to the final step to be visualized, the images of these intermediate steps can be manipulated to provide an intuitive indication on the capability of the network and rationale of the prediction. These visual indicators provide the trainer with feedback on how well the training and the prediction are behaving so that the model can be fine-tuned or adjusted, if necessary.

The process of visualizing intermediate activations consists of generating the output of the one or more intermediate convolutional layers of the CNN as images. These images can then be manipulated to aid the trainer on how to interpret them, such as by generating heat activation maps and/or annotate portions of the images with outlines or marks to show the image regions which activated the output that are relevant for each defect category.

Figure 35:
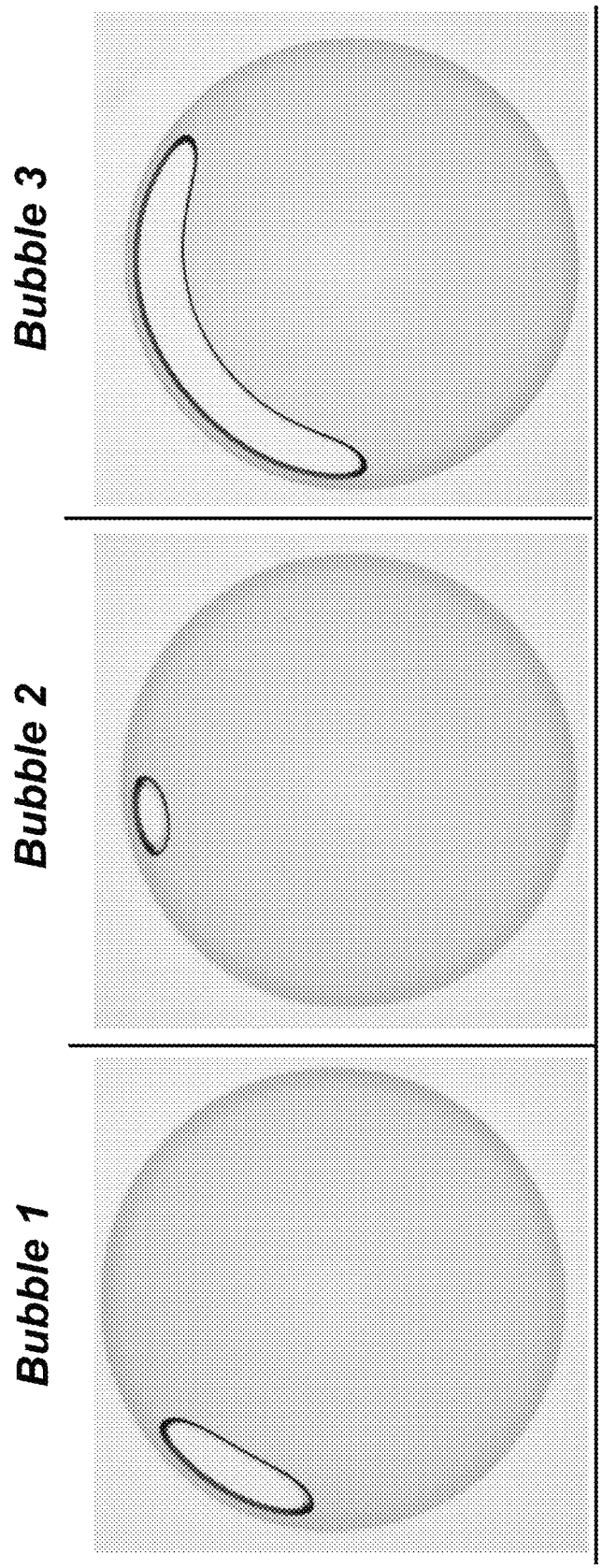
FIG. 35 shows three images as examples of the output of the lens region cropping step of the pre-processing step.

To demonstrate how intermediate activations and CAMs can be incorporated or implemented with the lens inspection system of the present invention, refer initially to FIG. 35. Three different outputs produced from the preprocessing step for three examples of "Bubble" surface defects are shown, annotated as Bubble 1, Bubble 2, and Bubble 3. As discussed with reference to the process of FIG. 3, these images represent inputs to the CNN model and each has a shape of 900×900 pixels. The input for the model can have the shape of (900, 900, 3), where the number "3" denotes the number of channels for a model that has been pretrained on RGB images, not grayscale. Thus, by artificially copying the gray channel to the other two channels, the grayscale images can be used as input for the model.

Figure 36B:
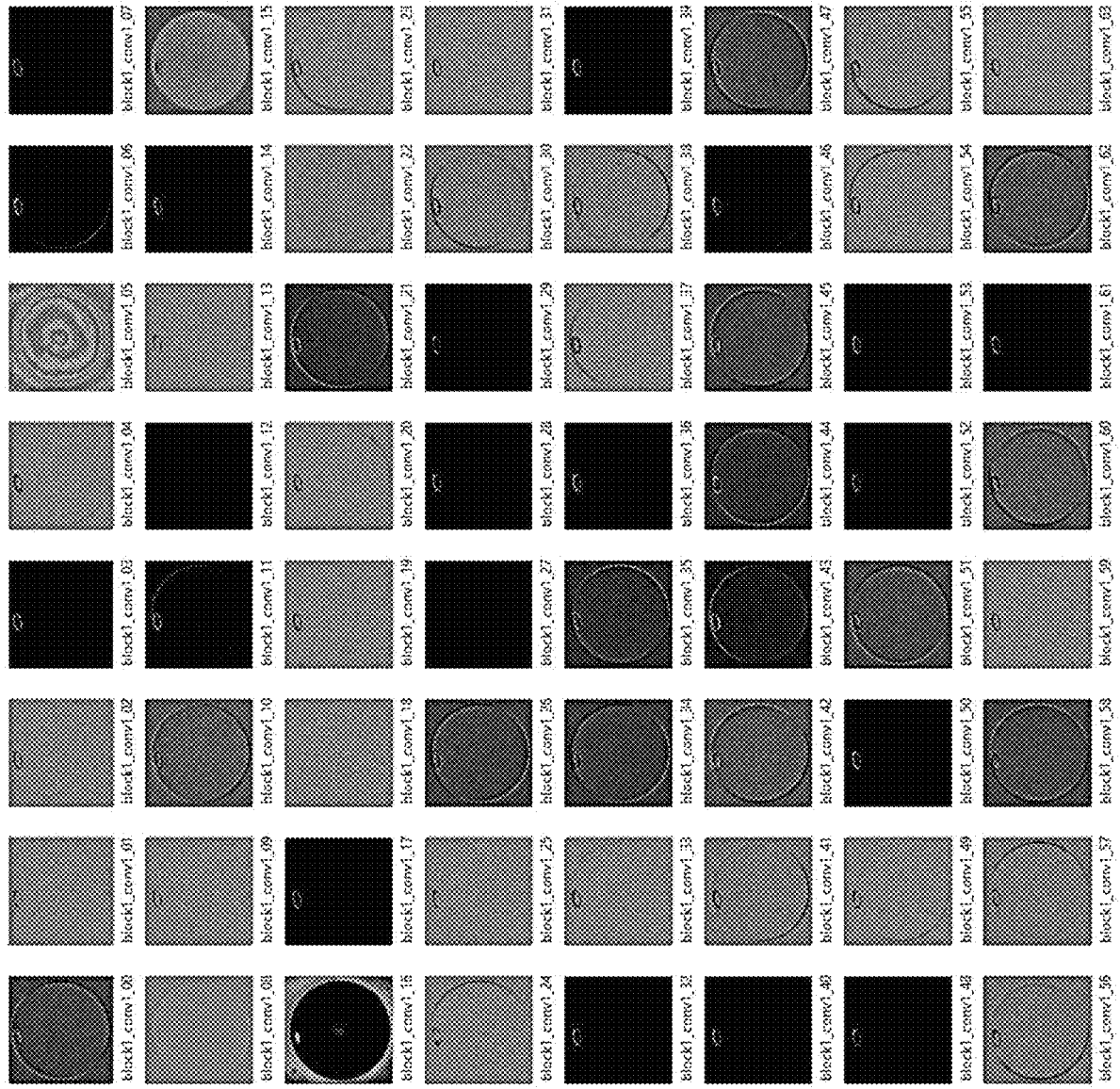

After the images from FIG. 35 are entered into the model and pass through the different convolutional layers (such as block1 or block 2 of FIG. 12), the output from these layers can be viewed as images. With reference now to FIGS. 36A, 36B, and 36C, a comparison between the 64 channel-output of the first convolution operation ("conv1") of the first convolutional block ("block1") for the three input images of FIG. 35 are shown. The first convolution operation ("conv1") represents the first processing step inside the CNN model. The output of each of the 64 channels has an image shape of 900×900 pixels. These images show what the CNN model is seeing while the model is being trained, or, for production images, while the model is predicting the class category. The images offer insights to the developer and trainer, which can be very crucial to the effectiveness and yield of the model. By using CAMs, the developer and trainer can see which region in the image the model was looking at and based on that can determine the reasons for the bias in the model. Thus, the model can be tweaked, or fine-tuned, based on CAMs so that the model can be more robust and deployable for production inspection using machine learning.

Figure 37:
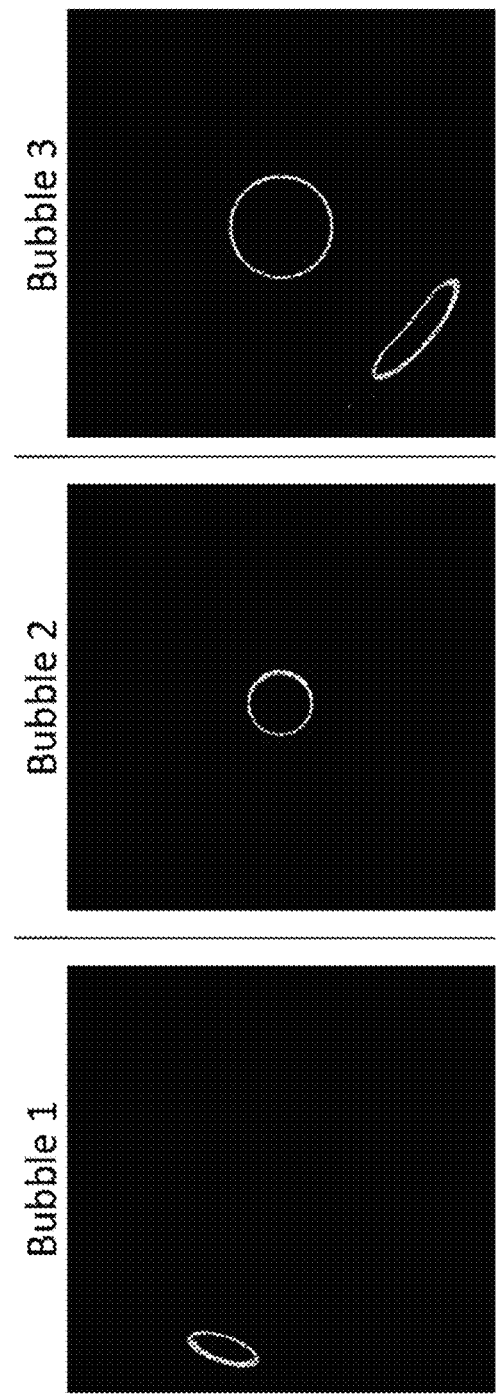
FIG. 37 shows enlarged images of one of the 64 channels for each of the three output examples of FIGS. 36A-36C.

FIG. 37 shows enlarged views or images of one of the 64 channels for each of the three output examples of FIGS. 36A-36C. After just the first processing step and based on the CAMs shown, the model is already succeeding in isolating the defect inside each input image. As each input image is processed by the different convolutional layers using different kernels or filters, different regions and aspects of the image are used. Some of the features can be readily recognizable while others can be more abstract, especially following the latter convolutional layers. Output images from these different layers can be utilized to aid the developer and trainer to program and finetune the model.

Figure 38:
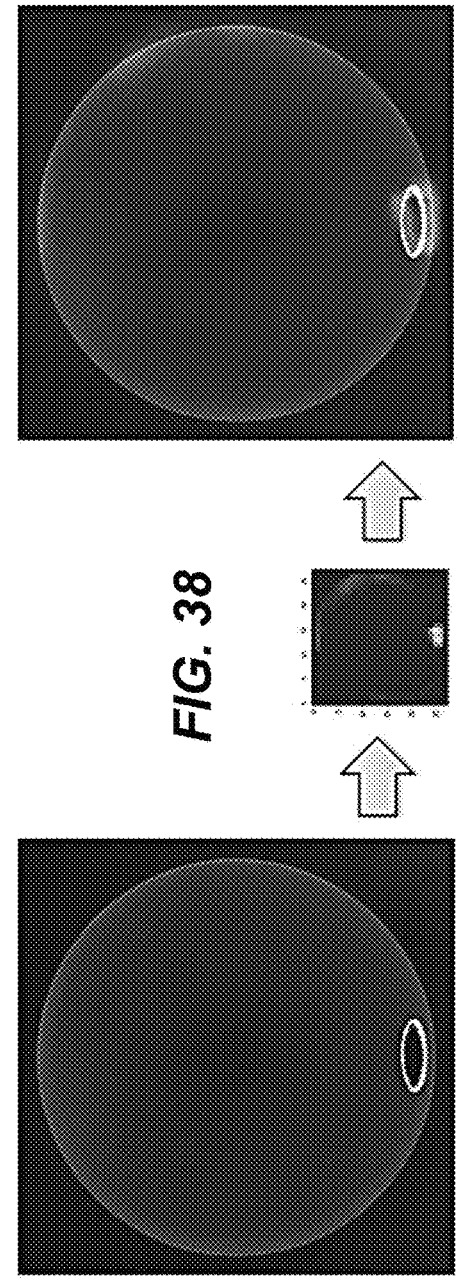
FIG. 38 shows a CAM of the final prediction class superimposed on a preprocessed image for a "Bubble" surface defect image.
Figure 39:
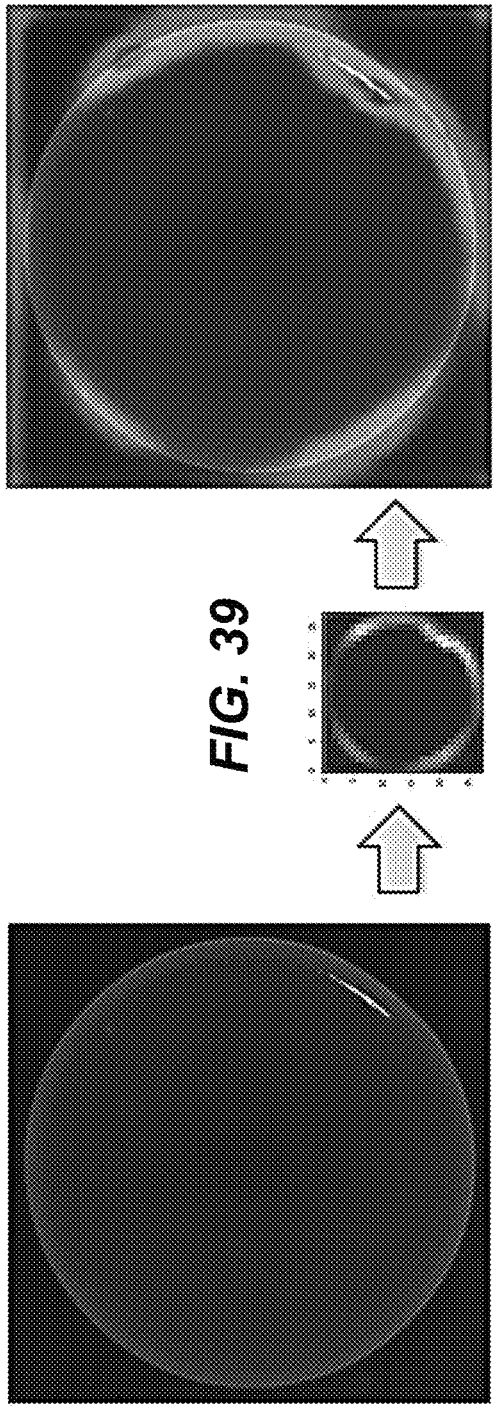
FIG. 39 shows a CAM of the final prediction class superimposed on a preprocessed image for a "Scratch" surface defect image.

CAMs are 2D grids of scores associated with a specific output class, computed for every location of an input image. They show how intensely each pixel in the image outputted by the last convolutional layer activates the specific output class, therefore are helpful for understanding which part or parts of the image led the model to its final classification decision. CAMs can be computed for each of the classes to evaluate, such as generated for eight (8) lens surface classifications and three (3) lens edge classifications. FIG. 38 shows the original input image (left) of a lens with a bubble and a CAM image (small middle) of the final prediction class computed based on the output of the last convolutional layer. The CAM image is then extrapolated and superimposed over the preprocessed image for the "Bubble" surface defect image (i.e., the left image), which is shown as a heat map (right image) and defines a labeled CAM. Like FIG. 38, FIG. 39 shows a CAM of the final prediction class superimposed on the preprocessed image for a "Scratch" surface defect image. The heatmap generated by the AI network assigns a color to all the pixels of the image, proportional to their level of importance in the activation of the predicted class.

As an example of how CAMs can be used to improve or finetune the model, take the CAM image for the "Scratch" surface defect image of FIG. 39. There was a clear tendency of the algorithm to use the edge as a predictor for the "Scratch" category. This can be seen by the heat map around the outer contour or edge of the lens in the image. This tendency can be reduced by, for example, increasing the training dataset to increase the accuracy of prediction of the "Scratch" category. CAMs can be used to assess whether the algorithm is learning the correct predictors for each of the several categories, not just for the "Scratch" category as shown.

Figure 40B:
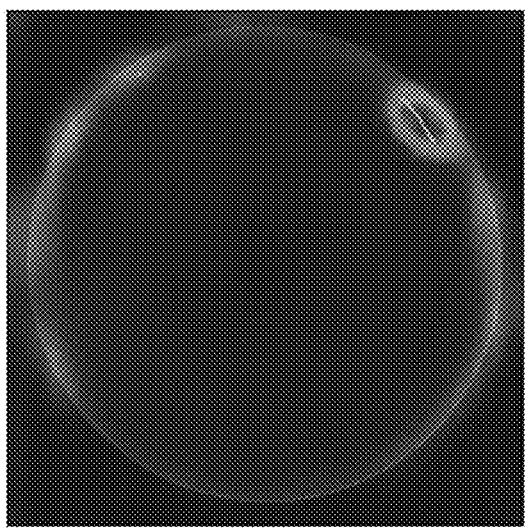
FIGS. 40A and 40B show CAM images for the "Scratch" category for the same image, but under different training protocols.
Figure 40A:
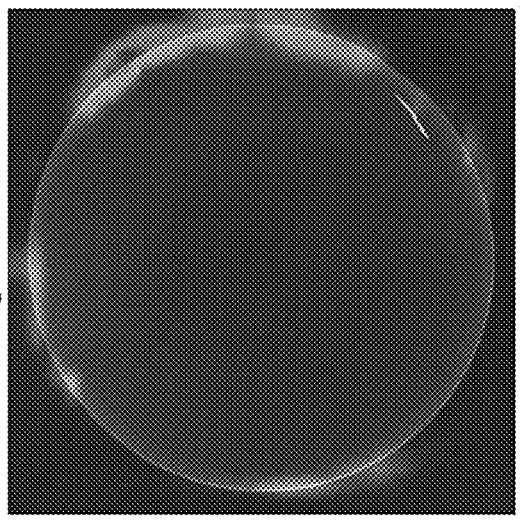
Figure 41:
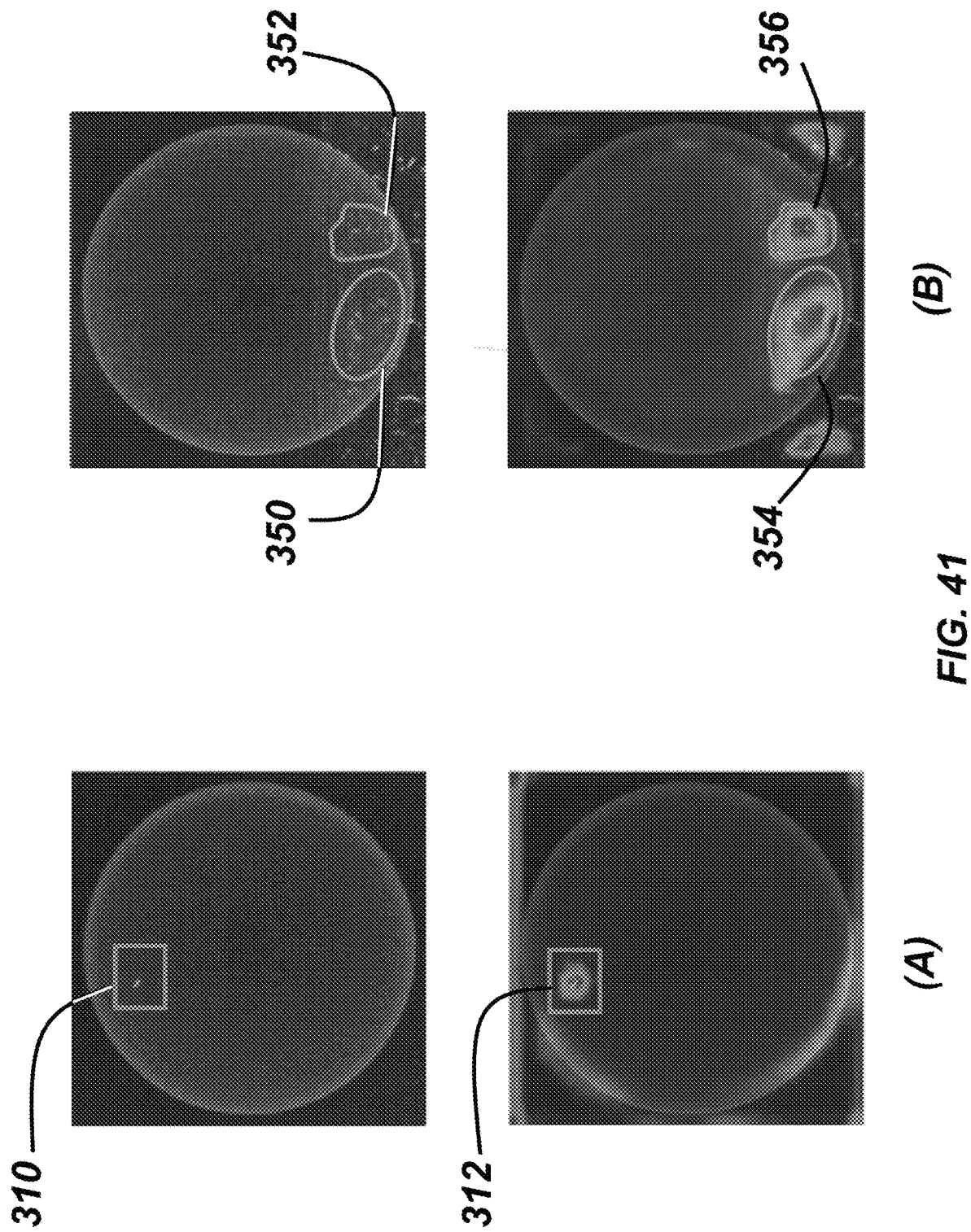
FIG. 41(A) shows a preprocessed image having a bounding box and a CAM of the final prediction class superimposed on the preprocessed image with a bounding box.
FIG. 41(B) shows a preprocessed image having two bounding boxes and a CAM of the final prediction class superimposed on the preprocessed image with bounding boxes.

FIGS. 40A and 40B show CAM images for the "Scratch" category for the same image, but under different training protocols. The CAM image of FIG. 40A for the "Scratch" category was obtain for a model trained on 500 images versus the same model trained on 700 images, shown in FIG. 40B. As can be seen from the side-by-side comparison of FIGS. 40A and 40B, the CNN model used less of the lens edge as a predictor for finding "Scratch" on the image of FIG. 40B. The same can be performed for each of the class categories. Thus, increasing the training dataset can be employed to improve classification accuracy, such as through additional image acquisition or data augmentation.

With reference now to FIG. 41(A), a preprocessed image having a bounding box 310 around a scratch on the surface of the lens is shown and a CAM of the final prediction class superimposed on the preprocessed image with the scratch with a bounding box 312 around the region of interest. The bounding box 312 on the CAM, also called a labeled CAM, can be computed based on the region of interest on the image, such as based on the profile of the heat map of the CAM image and then generated to define a boundary around the region of interest to facilitate review. In the present embodiment, the bounding box 312 is a generally square shape. The bounding box 312 derived for the CAM can then be superimposed on the preprocessed image so that the bounding box 310 around the region of interest on the preprocessed image, which may be in black-and-white, can more readily be observed. That is, the preprocessed image is labeled with a bounding box around a region of interest and wherein the bounding box around the region of interest on the preprocessed image is based on the labeled CAM image. For example, the location and shape of the bounding box on the preprocessed image can be based on the location and shape of the bounding box on the CAM image. In some examples, the bounding box on the preprocessed image and the bounding box on the CAM image can be the same or different shape. For example, the size of the bounding box on the preprocessed image can be sized smaller compared to the size of the bounding box on the CAM image since the preprocessed image does not contain any heat map.

The shape of the bounding box can vary, including having different polygonal shapes, a triangular shape, or an irregular shape, and can include more than one bounding box per image to annotate more than one region of interest within the image. The shape of the bounding box does not have to match the contour of the defect region of interest. In some examples, the actual contour of the defect region is intensified to annotate the defect. In some examples, the defect region on an original image, for each of a plurality of images to be analyzed or trained, is labeled, such as with a bounding box or by highlighting the contour of the defect region. The labelled original image, such as a preprocessed image, may be used for training, for displaying, for marketing, etc.

CAM allows the user or programmer to inspect the image to be categorized and understand which parts/pixels of that image have contributed more to the final output of the model. This can be very useful to improve the accuracy of the AI model because CAM helps to understand which layers need to be modified, or whether to pre-process the training set images differently, as an example. It is useful to visualize where a neural network is looking because it helps to understand if the neural network is looking at appropriate parts of the image, or if the neural network is classifying the image based on pattern.

With reference now to FIG. 41(B), a preprocessed image having bounding boxes 350, 352 around regions on the surface of the lens is shown and a CAM of the final prediction class superimposed on the preprocessed image with bounding boxes 350, 352 around regions of interest. In the present embodiment, the regions of interest are regions with dirty sapphire, upon which the lens was placed during image acquisition. The bounding boxes 350, 352 on the CAM can be computed based on the regions of interest on the image, such as based on the profile of the heat map of the CAM image. The computed bounding boxes 350, 352 can define boundaries around the regions of interest to facilitate review of the regions. In the present embodiment, the first bounding box 350 is generally elliptical or oval and the second bounding box 352 has an irregular shape. The bounding boxes 350, 352 derived for the CAM can then be superimposed on the preprocessed image so that the bounding boxes 350, 352 around the regions of interest on the preprocessed image, which may be in black-and-white, can readily be observed. In some examples, the bounding boxes on the preprocessed image and the bounding boxes on the CAM image can be the same or different.

As discussed above, the heatmap generated by the AI network assigns a color to all the pixels of the image, proportional to their level of importance in the activation of the predicted class. Instead of outputting the heatmap or in addition to the heatmap, a threshold can be established for the region of interest, which can be viewed or called a defect region, and then the defect region can be annotated with a bounding object, such as shown in FIGS. 41(A)-41(B).

CNN models used herein are multi-class single-label classifiers, therefore the output consists in a vector of probabilities. That is, the output for one model produces one vector of size (1, 8), one for each class the "surface" model has been trained on, and the output for another model produces one vector of size (1, 3), one for each class the "edge" model has been trained on. The final for each model is an index of the class with the highest probability for each analyzed image.

Figures 42, 43:
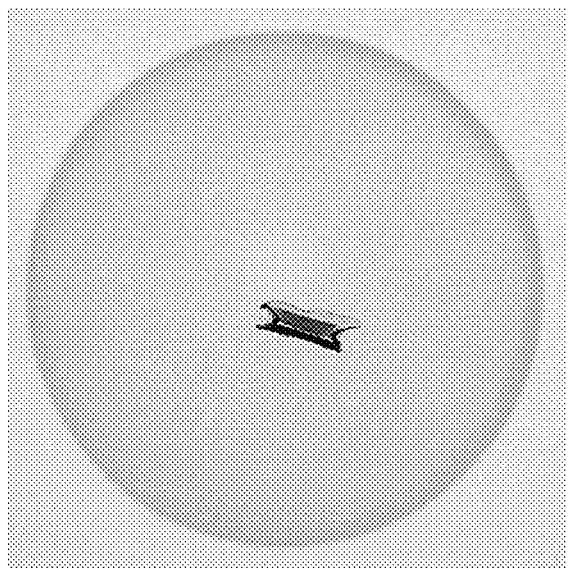
FIG. 42 is an example of a lens surface image showing lens with a "Debris".
FIG. 43 is an exemplary output of the lens inspection system in a table format showing probabilities of different defect classes for the lens surface image of FIG. 42.

In an example, the output vector of the "surface" model consists of eight (8) probabilities. The index of the classes can be programmed to correspond to the order shown in FIG. 43, for the image example shown in FIG. 42, which has a "Debris". As shown, for the image with the "Debris" of FIG. 42, the model produces output probabilities shown in FIG. 43. The output can be interpreted as the image having 20% chances of being "Brains", 74% chances of being "Debris", 6% chances of being "Double Lens" and very little chances of being anything else. The final output will be the class with the highest probability, which is "Debris" in this case. Optionally, the output of the lens inspection system can be a table of probabilities shown in FIG. 43.

To guard against data drift in which a well-trained model undergoes over time, the model can be trained with an "autoencoder" or "convolutional autoencoder" for image data. As an example, a new defect may be introduced by a change in the production process. If the model was not trained on this specific type of defect, there is a chance the trained model will fail to detect it as reason to fail the lens and therefore can identify the lens with the new defect a "Good lens". Re-training can be the ultimate solution to correct this situation.

Autoencoder learn a representation of the input data, to be able to output an as-close-as-possible image to the one received as input, based on the internal representation. Thus, this function learns representative features of the input data. The principle is to train the autoencoder on the training data used for the development of the prediction model, which can be a CNN model, such as a VGG 16 Net or a VGG19 Net. Once the autoencoder has been trained on the training data, some metrics can be calculated for how close the output images are to the input images to verify how similar the input image and the reconstructed image can be.

Further on, in the production environment, incoming data can also be passed to the encoder and the metrics established discussed above are calculated. If the quality of the reconstructed images is considerably below the expectation, then this is a red flag and may indicate a change in the input has happened. To help with re-training if a data drift issue has been identified, periodical image collection and maintaining a live dataset from the production line can be practiced to feed the model with the autoencoder.

The AI networks described herein have been trained and implemented as a multi-class single-label classifier. That is, while the networks can output a confidence level for each of the classes described, they cannot identify several defects found in the same input image. However, it is contemplated that the AI networks can be trained to operate as a multi-class multi-label classifier. That is, the models can be trained to identify several defects found in the same input image, which can have two or more defects in the same image. To achieve multiple-defect prediction, training datasets and validation datasets of images with multiple defects, such as both a "Bubble" and a "Scratch", must be acquired and used to train and validate the AI networks, such CNN models of the invention, and more particularly a VGG16, VGG19, AlexNet, Inception, and GoogleNet, to name a few. The training, validating, and predicting processes can follow the processes described elsewhere herein.

As previously alluded, the CNN models of the present invention can be trained to analyze and classify lenses in their wet state, such as when lenses are in blister packs filled with saline or other packaging solutions. Prior to sealing the blister packs with peelable covers, the lenses can be imaged in their wet state. The images of the wet state lenses can then be used to train and validate the models. The images can be taken with cameras with the same depth of focus settings so that edge and surface defects could be inspected in the same image. This allows the lens inspection system to operate using a single CNN model. Further, to help distinguish features on the lenses, on the blisters, or floating in the saline baths, images can be taken for the same lens in a first position and then rotated or moved to a second position. The two images of the same lens at two different positions can capture features that move relative to one another, which can be picked up by the CNN models as being associated with the blister pack, the lens, or the bath. Optionally, a first CNN model can be used to analyze images pre-rotation or pre-movement and a second CNN model can be used to analyze images post-rotation or post-movement.

Methods of training and of using the lens inspection systems and components thereof as presented herein are within the scope of the present invention.

Although limited embodiments of lens inspection systems and their components have been specifically described and illustrated herein, many modifications and variations will be apparent to those skilled in the art. Accordingly, it is to be understood that the lens inspection systems constructed according to principles of the disclosed devices, systems, and methods may be embodied in other than as specifically described herein. The disclosure is also defined in the following claims.

What is claimed is:

1. A method for inspecting ophthalmic lenses and assigning classification to images of the ophthalmic lenses comprising:
    a) accessing a first image with a computer system, the first image comprising a lens edge image of a first ophthalmic lens wherein the first image provides a view of the lens edge, in focus at a focal plane such that the lens edge is in focus, and contains a single, complete image of an entirety of the lens edge, wherein the first ophthalmic lens represented in the first image is represented in a polar coordinate system, wherein the polar coordinate system has been converted from a cartesian coordinate system;
    b) identifying a region on the first image to analyze for lens defect by processing the first image with an "edge" convolutional neural network implemented with a hardware processor and a memory of the computer system, the "edge" convolutional neural network being trained using a dataset comprising images with different defect types for lens edge defects;
    c) generating a class activation map (CAM) based on the first image;
    d) labelling a defect region on the CAM with at least one of a heatmap and a bounding box to define a labeled CAM and, thereafter outputting the labeled CAM; and
    e) generating and outputting a classification for the first image with the "edge" convolutional neural network to produce a first classified image, the classification based at least in part on the defect region, the classification being one of a plurality of lens edge defect classes;
    f) accessing a second image with a computer system, the second image comprising a lens surface image of the first ophthalmic lens, wherein the second image provides a single, complete view of the lens surface, the second image being in focus at a focal plane intersecting the lens above the lens edge such that the lens surface is in focus;
    g) identifying a region on the second image to analyze for lens defect by processing the second image with a "surface" convolutional neural network implemented with a hardware processor and a memory of the computer system, the "surface" convolutional neural network being trained using a dataset comprising images with different defect types for lens surface defects and being separate from the "edge" convolutional neural network;
    h) generating a class activation map (CAM) based on the second image;
    i) labelling a defect region on the CAM with at least one of a heatmap and a bounding box to define a labeled CAM and, thereafter, outputting the labeled CAM; and
    j) generating and outputting a classification for the second image with the "surface" convolutional neural network to produce a second classified image, the classification based at least in part on the defect region, the classification being one of a plurality of surface defect classes.

2. The method of claim 1, wherein the first image of the ophthalmic lens is acquired when the ophthalmic lens is located on a support in a dry state or when the ophthalmic lens is in a liquid bath in a wet state.

3. The method of claim 1, wherein the plurality of lens surface defect classes comprise at least two classes.

4. The method of claim 2, wherein the plurality of lens surface defect classes comprise at least two classes.

5. The method of claim 3, wherein the plurality of lens surface defect classes comprise at least three classes and the at least three classes comprise a Good Lens class, a Bubble class, and a Scratch class.

6. The method of claim 4, wherein the plurality of lens surface defect classes comprise at least three classes and the at least three classes comprise a Good Lens class, a Bubble class, and a Scratch class.

7. The method of claim 1, wherein the first image is acquired by a first camera and the first image having a height pixel value and a width pixel value and wherein the height and width pixel values are sized based on a template image acquired by the first camera.

8. The method of claim 2, wherein the first image is acquired by a first camera and the first image having a height pixel value and a width pixel value and wherein the height and width pixel values are sized based on a template image acquired by the first camera.

9. The method of claim 3, wherein the first image is acquired by a first camera and the first image having a height pixel value and a width pixel value and wherein the height and width pixel values are sized based on a template image acquired by the first camera.

10. The method of claim 1, wherein an AI network comprises the "edge" convolutional neural network and the "surface" convolutional neural network and the method further comprising retraining or finetuning the AI network based on information provided by the labeled CAM of the first image or the second image.

11. The method of claim 2, wherein an AI network comprises the "edge" convolutional neural network and the "surface" convolutional neural network and the method further comprising retraining or finetuning the AI network based on information provided by the labeled CAM of the first image or the second image.

12. The method of claim 3, wherein an AI network comprises the "edge" convolutional neural network and the "surface" convolutional neural network and the method further comprising retraining or finetuning the AI network based on information provided by the labeled CAM of the first image or the second image.

13. The method of claim 10, further comprising retraining or finetuning the AI network by performing at least one of the following steps: (1) removing fully connected nodes at an end of the AI network where actual class label predictions are made; (2) replacing fully connected nodes with freshly initialized ones; (3) freezing earlier or top convolutional layers in the AI network to ensure that any previous robust features learned by the AI network are not overwritten or discarded; (4) training only fully connected layers with a certain learning rate; and (5) unfreezing some or all convolutional layers in the AI network and performing additional training with same or new datasets with a relatively smaller learning rate.

14. The method of claim 1, wherein the second image is acquired by a second camera and the second image having a height pixel value and a width pixel value and wherein the height and width pixel values of the second image are sized based on a template image acquired by the second camera.

15. The method of claim 2, wherein the second image is acquired by a second camera and the second image having a height pixel value and a width pixel value and wherein the height and width pixel values of the second image are sized based on a template image acquired by the second camera.

16. The method of claim 3, wherein the second image is acquired by a second camera and the second image having a height pixel value and a width pixel value and wherein the height and width pixel values of the second image are sized based on a template image acquired by the second camera.

17. The method of claim 13, wherein the second image is acquired by a second camera and the second image having a height pixel value and a width pixel value and wherein the height and width pixel values of the second image are sized based on a template image acquired by the second camera.

18. The method of claim 1, wherein the CAM of the first image or the second image is computed based on an output of a last convolutional layer.

19. The method of claim 3, wherein the CAM of the first image or the second image is computed based on an output of a last convolutional layer.

20. The method of claim 5, wherein the CAM of the first image or the second image is computed based on an output of a last convolutional layer.

21. The method of claim 7, wherein the CAM of the first image or the second image is computed based on an output of a last convolutional layer.

22. The method of claim 18, wherein the first image is a preprocessed image and wherein the CAM is extrapolated and superimposed over the preprocessed first image.

23. The method of claim 1, wherein the "edge" convolutional neural network and "surface" convolutional neural network reside on a Cloud server of a computer system having a storage memory with the first image and the second image stored thereon, or on a computer system having a storage memory not having the first image and the second image stored thereon.

24. The method of claim 13, wherein the "edge" convolutional neural network and "surface" convolutional neural network reside on a Cloud server of a computer system having a storage memory with the first image and the second image stored thereon, or on a computer system having a storage memory not having the first image and the second image stored thereon.

25. A system for classifying lens images of ophthalmic lenses comprising:
  at least one hardware processor;
  a memory having stored thereon instructions that when executed by the at least one hardware processor cause the at least one hardware processor to perform the method of claim 1.

26. The system of claim 25, wherein the first image is labeled with a bounding box around a region of interest, wherein the bounding box around the region of interest on the first image is based on the labeled CAM.

* * * * *